(12) United States Patent
Cedrone et al.

(10) Patent No.: US 9,025,454 B2
(45) Date of Patent: *May 5, 2015

(54) I/O SYSTEMS, METHODS AND DEVICES FOR INTERFACING A PUMP CONTROLLER

(75) Inventors: James Cedrone, Braintree, MA (US); Robert F. McLoughlin, Pelham, NH (US); George Gonnella, Pepperell, MA (US)

(73) Assignee: Entegris, Inc., Billerica, MA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/081,308

(22) Filed: Apr. 6, 2011

(65) Prior Publication Data

US 2011/0208890 A1 Aug. 25, 2011

Related U.S. Application Data

(63) Continuation of application No. 11/602,449, filed on Nov. 20, 2006, now Pat. No. 7,940,664.

(60) Provisional application No. 60/741,657, filed on Dec. 2, 2005.

(51) Int. Cl.
*G01R 31/08* (2006.01)
*G05B 19/042* (2006.01)
(Continued)

(52) U.S. Cl.
CPC ............ *G05B 19/042* (2013.01); *F04B 49/065* (2013.01); *G05B 2219/25204* (2013.01); *H04L 67/12* (2013.01)

(58) Field of Classification Search
None
See application file for complete search history.

(56) References Cited

U.S. PATENT DOCUMENTS

| 269,626 A | 12/1882 | Bodel et al. |
| 826,018 A | 7/1906 | Concoff |
| 1,664,125 A | 3/1928 | Lowrey |

(Continued)

FOREIGN PATENT DOCUMENTS

| AU | B-78872/87 | 4/1988 |
| CA | 1271140 | 7/1990 |

(Continued)

OTHER PUBLICATIONS

Office Action issued in Japanese Patent Application No. 2008-543351, mailed May 18, 2011, 10 pages.

(Continued)

*Primary Examiner* — Anez Ebrahim
(74) *Attorney, Agent, or Firm* — Sprinkle IP Law Group

(57) ABSTRACT

Embodiments of the present invention provide I/O systems, methods, and devices for interfacing pump controller(s) with control device(s) which may have different interfaces and/or signaling formats. In one embodiment, an I/O interface module comprises a processor, a memory, and at least two data communications interfaces for communicating with a pumping controller and a control device. The I/O interface module can receive discrete signals from the control device, interpret them accordingly and send the packets to the pump controller. The pump controller reads the packets and takes appropriate actions at the pump. The I/O interface module can interpret packets of data received from the pump controller and assert corresponding discrete signals to the control device. The I/O interface module is customizable and allows a variety of interfaces and control schemes to be implemented with a particular multiple stage pump without changing the hardware of the pump.

18 Claims, 14 Drawing Sheets

(51) Int. Cl.
*F04B 49/06* (2006.01)
*H04L 29/08* (2006.01)

(56) References Cited

U.S. PATENT DOCUMENTS

| | | | |
|---|---|---|---|
| 2,153,664 A | 4/1939 | Freedlander | |
| 2,215,505 A | 9/1940 | Hollander | |
| 2,328,468 A | 8/1943 | Laffly | |
| 2,457,384 A | 12/1948 | Krenz | |
| 2,631,538 A | 3/1953 | Johnson | |
| 2,673,522 A | 3/1954 | Dickey | |
| 2,757,966 A | 8/1956 | Samiran | |
| 3,072,058 A | 1/1963 | Christopher et al. | |
| 3,227,279 A | 1/1966 | Bockelman | |
| 3,327,635 A | 6/1967 | Sachnik | |
| 3,623,661 A | 11/1971 | Wagner | |
| 3,741,298 A | 6/1973 | Canton | |
| 3,895,748 A | 7/1975 | Klingenberg | |
| 3,954,352 A | 5/1976 | Sakai | |
| 4,023,592 A | 5/1977 | Patzke | |
| 4,093,403 A | 6/1978 | Schrimpf | |
| 4,452,265 A | 6/1984 | Lonnebring | |
| 4,483,665 A | 11/1984 | Hauser | |
| 4,541,455 A | 9/1985 | Hauser | |
| 4,597,719 A | 7/1986 | Tano | |
| 4,597,721 A | 7/1986 | Santefort | |
| 4,601,409 A | 7/1986 | DiRegolo | |
| 4,614,438 A | 9/1986 | Kobayahsi | |
| 4,671,545 A | 6/1987 | Miyazaki | |
| 4,690,621 A | 9/1987 | Swain | |
| 4,705,461 A | 11/1987 | Clements | |
| 4,797,834 A | 1/1989 | Honganen et al. | |
| 4,808,077 A | 2/1989 | Kan et al. | |
| 4,810,168 A | 3/1989 | Nogami et al. | |
| 4,821,997 A | 4/1989 | Zdeblick | |
| 4,824,073 A | 4/1989 | Zdeblick | |
| 4,865,525 A | 9/1989 | Kern | |
| 4,913,624 A | 4/1990 | Seki et al. | |
| 4,915,126 A | 4/1990 | Gyllinder | |
| 4,943,032 A | 7/1990 | Zdeblick | |
| 4,950,134 A | 8/1990 | Bailey | |
| 4,952,386 A | 8/1990 | Davison | |
| 4,966,646 A | 10/1990 | Zdeblick | |
| 5,061,156 A | 10/1991 | Kuehne | |
| 5,061,574 A | 10/1991 | Henager, Jr. | |
| 5,062,770 A | 11/1991 | Story | |
| 5,134,962 A | 8/1992 | Amada | |
| 5,135,031 A | 8/1992 | Burgess | |
| 5,167,837 A | 12/1992 | Snodgrass | |
| 5,192,198 A | 3/1993 | Gebauer | |
| 5,261,442 A | 11/1993 | Kingsford | |
| 5,262,068 A | 11/1993 | Bowers | |
| 5,316,181 A | 5/1994 | Burch | |
| 5,344,195 A | 9/1994 | Parimore, Jr. et al. | |
| 5,350,200 A | 9/1994 | Peterson et al. | |
| 5,380,019 A | 1/1995 | Hillery | |
| 5,434,774 A | 7/1995 | Seberger | |
| 5,476,004 A | 12/1995 | Kingsford | |
| 5,490,765 A | 2/1996 | Bailey | |
| 5,511,797 A | 4/1996 | Nikirk | |
| 5,516,429 A | 5/1996 | Snodgrass | |
| 5,527,161 A | 6/1996 | Bailey | |
| 5,546,009 A | 8/1996 | Raphael | |
| 5,575,311 A | 11/1996 | Kingsford | |
| 5,580,103 A | 12/1996 | Hall | |
| 5,599,100 A | 2/1997 | Jackson et al. | |
| 5,599,394 A | 2/1997 | Yabe | |
| 5,645,301 A | 7/1997 | Kingsford | |
| 5,652,391 A | 7/1997 | Kingsford | |
| 5,653,251 A | 8/1997 | Handler | |
| 5,657,334 A * | 8/1997 | Das et al. | 372/33 |
| 5,743,293 A | 4/1998 | Kelly | |
| 5,762,795 A | 6/1998 | Bailey | |
| 5,772,899 A | 6/1998 | Snodgrass | |
| 5,784,573 A | 7/1998 | Szczepanek et al. | |
| 5,785,508 A | 7/1998 | Bolt | |
| 5,793,754 A | 8/1998 | Houldsworth et al. | |
| 5,839,828 A | 11/1998 | Glanville | |
| 5,848,605 A | 12/1998 | Bailey | |
| 5,947,702 A | 9/1999 | Biederstadt | |
| 5,971,723 A | 10/1999 | Bolt | |
| 5,991,279 A | 11/1999 | Haugli et al. | |
| 6,033,302 A | 3/2000 | Ahmed et al. | |
| 6,105,829 A | 8/2000 | Snodgrass | |
| 6,190,565 B1 | 2/2001 | Bailey | |
| 6,238,576 B1 | 5/2001 | Yajima | |
| 6,250,502 B1 | 6/2001 | Cote | |
| 6,251,293 B1 | 6/2001 | Snodgrass | |
| 6,302,660 B1 | 10/2001 | Kurita | |
| 6,318,971 B1 | 11/2001 | Ota | |
| 6,325,032 B1 | 12/2001 | Sekiya et al. | |
| 6,325,932 B1 | 12/2001 | Gibson | |
| 6,330,517 B1 | 12/2001 | Dobrowski | |
| 6,348,124 B1 | 2/2002 | Garbett | |
| 6,473,059 B1 | 10/2002 | Yasue | |
| 6,474,950 B1 | 11/2002 | Waldo | |
| 6,478,547 B1 | 11/2002 | Savard | |
| 6,506,030 B1 | 1/2003 | Kottke | |
| 6,540,265 B2 | 4/2003 | Turk | |
| 6,554,579 B2 | 4/2003 | Martin | |
| 6,592,825 B2 | 7/2003 | Pelc | |
| 6,635,183 B2 | 10/2003 | Gibson | |
| 6,742,992 B2 | 6/2004 | Davis | |
| 6,742,993 B2 | 6/2004 | Savard | |
| 6,766,810 B1 | 7/2004 | Van Cleemput | |
| 6,767,877 B2 | 7/2004 | Kuo | |
| 6,837,484 B2 | 1/2005 | Kingsford | |
| 6,901,791 B1 | 6/2005 | Frenz et al. | |
| 6,925,072 B1 | 8/2005 | Grohn | |
| 6,952,618 B2 | 10/2005 | Davlin et al. | |
| 7,012,899 B1 * | 3/2006 | Hagler et al. | 370/252 |
| 7,013,223 B1 | 3/2006 | Zhang et al. | |
| 7,029,238 B1 | 4/2006 | Zagars | |
| 7,063,785 B2 | 6/2006 | Hiraku et al. | |
| 7,083,202 B2 | 8/2006 | Eberle et al. | |
| 7,156,115 B2 | 1/2007 | Everett et al. | |
| 7,247,245 B1 | 7/2007 | Proulx et al. | |
| 7,249,628 B2 | 7/2007 | Pillion et al. | |
| 7,272,452 B2 | 9/2007 | Coogan et al. | |
| 7,362,798 B1 | 4/2008 | Starnberger | |
| 7,383,967 B2 | 6/2008 | Gibson | |
| 7,454,317 B2 | 11/2008 | Karasawa | |
| 7,476,087 B2 | 1/2009 | Zagars et al. | |
| 7,494,265 B2 | 2/2009 | Niermeyer et al. | |
| 7,547,049 B2 | 6/2009 | Gashgaee | |
| 7,940,664 B2 | 5/2011 | Cedrone et al. | |
| 2002/0018657 A1 * | 2/2002 | Serizawa | 399/27 |
| 2002/0044536 A1 | 4/2002 | Izumi et al. | |
| 2002/0095240 A1 | 7/2002 | Sickinger | |
| 2002/0197584 A1 * | 12/2002 | Kendir et al. | 434/21 |
| 2003/0033052 A1 | 2/2003 | Hillen et al. | |
| 2003/0040881 A1 | 2/2003 | Steger | |
| 2003/0148759 A1 | 8/2003 | Leliveld | |
| 2003/0222798 A1 | 12/2003 | Floros | |
| 2004/0000904 A1 * | 1/2004 | Cotter | 324/239 |
| 2004/0013531 A1 * | 1/2004 | Curry et al. | 417/42 |
| 2004/0050771 A1 | 3/2004 | Gibson | |
| 2004/0072450 A1 | 4/2004 | Collins | |
| 2004/0133728 A1 | 7/2004 | Ellerbrock et al. | |
| 2005/0061722 A1 | 3/2005 | Takao et al. | |
| 2005/0113941 A1 | 5/2005 | Ii et al. | |
| 2005/0126985 A1 | 6/2005 | Campbell | |
| 2005/0182497 A1 | 8/2005 | Nakano | |
| 2005/0184087 A1 | 8/2005 | Zagars | |
| 2005/0197722 A1 | 9/2005 | Varone et al. | |
| 2005/0232296 A1 | 10/2005 | Schultze et al. | |
| 2005/0238497 A1 | 10/2005 | Holst | |
| 2005/0240541 A1 * | 10/2005 | Giacaman | 705/413 |
| 2006/0015294 A1 | 1/2006 | Yetter et al. | |
| 2006/0045750 A1 * | 3/2006 | Stiles | 417/42 |
| 2006/0070960 A1 | 4/2006 | Gibson | |
| 2006/0083259 A1 | 4/2006 | Metcalf et al. | |
| 2006/0203776 A1 * | 9/2006 | Persaud et al. | 370/331 |
| 2007/0104586 A1 | 5/2007 | Cedrone | |

(56) References Cited

U.S. PATENT DOCUMENTS

| | | |
|---|---|---|
| 2007/0125796 A1 | 6/2007 | Cedrone |
| 2007/0125797 A1 | 6/2007 | Cedrone |
| 2007/0126233 A1 | 6/2007 | Gashgaee |
| 2007/0127511 A1 | 6/2007 | Cedrone |
| 2007/0128046 A1 | 6/2007 | Gonnella |
| 2007/0128047 A1 | 6/2007 | Gonnella |
| 2007/0128048 A1 | 6/2007 | Gonnella |
| 2007/0128050 A1 | 6/2007 | Cedrone |
| 2007/0206436 A1 | 9/2007 | Niermeyer et al. |
| 2007/0217442 A1 | 9/2007 | McLoughlin |
| 2008/0089361 A1 | 4/2008 | Metcalf et al. |
| 2008/0131290 A1 | 6/2008 | Magoon et al. |
| 2009/0047143 A1 | 2/2009 | Cedrone |
| 2011/0213504 A1 | 9/2011 | Cedrone et al. |

FOREIGN PATENT DOCUMENTS

| | | |
|---|---|---|
| CN | 1331783 A | 1/2002 |
| DE | 29909100 U1 | 8/1999 |
| EP | 0249655 A | 12/1987 |
| EP | 0410394 A | 1/1991 |
| EP | 0261972 B1 | 12/1992 |
| EP | 0863538 A2 | 9/1998 |
| EP | 0867649 A2 | 9/1998 |
| EP | 0892204 A2 | 1/1999 |
| EP | 1071067 | 1/2001 |
| EP | 1133639 B1 | 6/2004 |
| GB | 661 522 A | 11/1951 |
| JP | 58203340 A | 11/1983 |
| JP | 08-16512 | 1/1996 |
| JP | 9-81207 | 3/1997 |
| JP | 9-282271 | 10/1997 |
| JP | 11026430 A | 1/1999 |
| JP | 2001-34374 | 2/2001 |
| JP | 2001-154930 | 6/2001 |
| JP | 2001-290754 | 10/2001 |
| JP | 2003-516655 | 5/2003 |
| JP | 2003198356 | 7/2003 |
| JP | 2004-52727 | 2/2004 |
| JP | 2005-321296 | 11/2005 |
| JP | 2009-517601 | 4/2009 |
| JP | 2009-517778 | 4/2009 |
| JP | 2009-517888 | 4/2009 |
| JP | 2009517618 | 4/2009 |
| JP | 2009-521636 | 6/2009 |
| WO | WO 9635876 A | 11/1996 |
| WO | WO9937435 | 7/1999 |
| WO | WO9966415 A1 | 12/1999 |
| WO | WO 0031416 A1 | 6/2000 |
| WO | WO 0140646 A3 | 6/2001 |
| WO | WO 02090771 A2 | 11/2002 |
| WO | WO2005079235 | 9/2005 |
| WO | WO 2006057957 A2 | 6/2006 |
| WO | WO2007067359 A2 | 6/2007 |

OTHER PUBLICATIONS

Brochure describing a Chempure Pump—A Furon Product, 1996. Furon Company, Anaheim, CA 92806, USA, 2 pages.

Krishna et al.,"Characterization of Low Viscosity Photoresist Coating," Advances in Resist Tech. and Processing XV (Proceedings of SPIE (The Int'l Society of Optical Engineering), 2/23-25/98, Santa Clara, CA, vol. 3333 (Part Two of Two Parts), 15 pages.

English translation of Chinese Patent Office Official Action, Chinese Patent Application No. 200410079193.0, 5 pages.

International Search Report and Written Opinion issued in International Patent Application No. PCT/US2006/045127, mailed May 23, 2007, 7 pages.

International Search Report and Written Opinion issued in International Patent Application No. PCT/US2006/044908, mailed Jul. 16, 2007, 10 pages.

International Search Report and Written Opinion issued in International Patent Application No. PCT/US2006/045175, mailed Jul. 25, 2007, 8 pages.

International Search Report and Written Opinion issued in International Patent Application No. PCT/US2006/044907, mailed Aug. 8, 2007, 9 pages.

International Search Report and Written Opinion issued in International Patent Application No. PCT/US2006/045177, mailed Aug. 9, 2007, 7 pages.

European Patent Office Official Action issued in European Patent Application No. 00982386.5, dated Sep. 4, 2007, 8 pages.

International Search Report and Written Opinion issued in International Patent Application No. PCT/US2006/044906, mailed Sep. 5, 2007, 8 pages.

International Search Report and Written Opinion issued in International Patent Application No. PCT/US2005/042127, mailed Sep. 26, 2007, 8 pages.

International Search Report and Written Opinion issued in International Patent Application No. PCT/US2006/044980, mailed Oct. 4, 2007, 9 pages.

Office Action issued in U.S. Appl. No. 11/051,576, mailed Dec. 13, 2007, 21 pages.

International Search Report and Written Opinion issued in International Patent Application No. PCT/US2006/045176, mailed Apr. 21, 2006, 9 pages.

Office Action issued in U.S. Appl. No. 11/602,513, mailed May 22, 2008, 10 pages.

International Search Report and Written Opinion issued in International Patent Application No. PCT/US2007/05377, mailed Jun. 4, 2008, 13 pages.

English translation of Chinese Patent Office Official Action, Chinese Patent Application No. 2005101088364, issued May 23, 2008, 6 pages.

International Search Report and Written Opinion issued in International Patent Application No. PCT/US06/44985, mailed Jun. 23, 2008, 7 pages.

International Search Report and Written Opinion issued in International Patent Application No. PCT/US07/17017, mailed Jul. 3, 2008, 9 pages.

International Search Report and Written Opinion issued in International Patent Application No. PCT/US06/44981, dated Aug. 8, 2008, 10 pages.

Office Action issued in U.S. Appl. No. 11/365,395, dated Aug. 19, 2008, 19 pages.

Office Action issued in U.S. Appl. No. 11/292,559 dated Aug. 28, 2008, 19 pages.

Office Action issued in U.S. Appl. No. 11/602,513, dated Nov. 14, 2008, 7 pages.

Office Action issued in U.S. Appl. No. 11/364,286, dated Nov. 14, 2008, 11 pages.

International Preliminary Report on Patentability issued in International Patent Application No. PCT/US07/17017, mailed Jan. 13, 2009, 8 pages.

International Preliminary Report on Patentability, Chap. I, issued in International Patent Application No. PCT/US2006/044981, mailed Nov. 6, 2008, 7 pages.

International Preliminary Report on Patentability, Chap. II, issued in International Patent Application No. PCT/US2006/044981, mailed Feb. 2, 2009, 9 pages.

Office Action issued in U.S. Appl. No. 11/365,395, mailed Feb. 2, 2009, 18 pages.

Office Action issued in U.S. Appl. No. 11/292,559, mailed Dec. 24, 2008, 18 pages.

International Preliminary Report on Patentability issued in International Patent Application No. PCT/US2006/044985, mailed Apr. 9, 2009, 5 pages.

Office Action issued in U.S. Appl. No. 11/292,559, mailed Apr. 17, 2009, 20 pages.

Office Action issued in U.S. Appl. No. 11/273,091 mailed Feb. 17, 2006, 8 pages.

Office Action issued in U.S. Appl. No. 11/273,091 mailed Jul. 3, 2006, 8 pages.

Office Action issued in U.S. Appl. No. 11/273,091 mailed Oct. 13, 2006, 8 pages.

Office Action issued in U.S. Appl. No. 11/273,091 mailed Feb. 23, 2007, 6 pages.

(56) References Cited

OTHER PUBLICATIONS

Office Action issued in U.S. Appl. No. 11/273,091 mailed Oct. 15, 2007, 8 pages.
Office Action issued in U.S. Appl. No. 11/386,427 mailed Nov. 13, 2007, 11 pages.
Office Action issued in U.S. Appl. No. 11/364,286 mailed Jun. 1, 2009, 14 pages.
International Preliminary Report on Patentability, Chapter I, issued in International Patent Application No. PCT/US2006/045176, mailed Apr. 9, 2009.
Intellectual Property Office of Singapore, Written Opinion issued in Patent Application No. 200803948-9 dated Jul. 2, 2009, Inc., 10 pages.
International Search Report issued in International Patent Application No. PCT/US99/28002, mailed Mar. 14, 2000, 5 pages.
Written Opinion issued in International Patent Application No. PCT/US99/28002, mailed Oct. 25, 2000, 8 pages.
International Preliminary Examination Report issued in International Patent Application No. PCT/US99/28002, mailed Feb. 21, 2001, 9 pages.
International Search Report and Written Opinion issued in International Patent Application No. PCT/US06/44907, mailed Aug. 8, 2007, 9 pages.
International Preliminary Report on Patentability, Ch. I, and Written Opinion issued in International Patent Application No. PCT/US06/044906, mailed Jun. 5, 2008, 7 pages.
International Preliminary Report on Patentability, Ch. I, and Written Opinion issued in International Patent Application No. PCT/US2006/044907, mailed Jun. 5, 2008, 7 pages.
International Preliminary Report on Patentability, Ch. I, and Written Opinion issued in International Patent Application No. PCT/US2006/044980, mailed Jun. 12, 2008, 7 pages.
PCT, International Preliminary Report on Patentability, Ch. I, and Written Opinion issued in International Patent Application No. PCT/US2006/044908, mailed Jun. 12, 2008, 8 pages.
International Preliminary Report on Patentability, Ch. I, and Written Opinion issued in International Patent Application No. PCT/US2006/045175, mailed Jun. 12, 2008, 6 pages.
International Preliminary Report on Patentability, Ch. I, and Written Opinion issued in International Patent Application No. PCT/US2006/045127, mailed Jun. 12, 2008, 8 pages.
International Preliminary Report on Patentability, Ch. I, and Written Opinion issued in International Patent Application No. PCT/US2006/045177, mailed Jun. 12, 2008, 5 pages.
International Preliminary Report on Patentability, Ch. II, issued in International Patent Application No. PCT/US07/05377, mailed Oct. 14, 2008, 14 pages.
European Search Report issued in European Patent Application No. 06838223.3, dated Aug. 12, 2009, 8 pages.
Japanese Laid Open Publication No. JP-2009-528631, published Aug. 6, 2009, with International Search Report, Japanese Patent Office, 38 pages.
Office Action issued in U.S. Appl. No. 09/447,504 mailed Feb. 27, 2001, 4 pages.
Office Action issued in U.S. Appl. No. 09/447,504 mailed Nov. 18, 2003, 4 pages.
Office Action issued in U.S. Appl. No. 09/447,504 mailed Jul. 13, 2004, 5 pages.
Japanese Laid Open Publication No. JP-2009-529847, published Aug. 20, 2009, with International Search Report, Japanese Patent Office, 21 pages.
Intellectual Property Office of Singapore, Written Opinion issued in Patent Application No. 200703671-8 dated Jul. 20, 2009, 4 pages.
English Translation of Chinese Patent Office Official Action, Chinese Patent Application No. 200580039961.2, dated Aug. 21, 2009, 33 pages.
Intellectual Property Office of Singapore, Written Opinion issued in Patent Application No. 200806425-5 dated Oct. 14, 2009, 8 pages.
Office Action issued in U.S. Appl. No. 11/602,507 mailed Oct. 28, 2009, 12 pages.
Office Action issued in U.S. Appl. No. 11/292,559 mailed Nov. 3, 2009, 17 pages.
Office Action issued in U.S. Appl. No. 11/364,286 mailed Nov. 9, 2009, 19 pages.
Intellectual Property Office of Singapore, Written Opinion issued in Patent Application No. 200803948-9 dated Jan. 19, 2010, 10 pages.
European Examination Report for European Patent Application No. 068 38 223.3, issued on Nov. 26, 2009, 1 page.
English Translation of Chinese Office Action for Chinese Application No. 200680050809.9, issued on Jan. 29, 2010, 7 pages.
Office Action issued in U.S. Appl. No. 11/602,449, mailed Mar. 15, 2010, 18 pages.
Written Opinion issued for Singaporean Patent Application No. 200803948-9, mailed Nov. 23, 2010, 11 pages.
Final Examination Report issued for Singaporean Patent Application No. 200803948-9, mailed Aug. 1, 2001, 11 pgs.
Notice of Allowance for Japanese Patent Application No. JP2008-543351, mailed Sep. 16, 2011, 3 pgs.
Office Action issued for Korean Patent Application No. 10-2008-7015349, mailed May 30, 2013, 11 pages.
Office Action issued in U.S. Appl. No. 13/104,468, mailed Jun. 14, 2013, 31 pages.
Office Action for U.S. Appl. No. 13/104,468, mailed Nov. 28, 2012, 17 pgs.
Office Action issued for Taiwanese Patent Application No. 095143018, mailed Feb. 6, 2013, 13 pages.
Final Office Action issued for U.S. Appl. No. 13/104,468, mailed Dec. 30, 2013, 21 pages.
Notice of Allowance issued for Korean Patent Application No. 10-2008-7015349, mailed Dec. 26, 2013, 3 pages.
Office Action issued for Japanese Patent Application No. 2011-173159, mailed Apr. 14, 2014, 9 pages.
Notice of Allowance for U.S. Appl. No. 13/104,468, mailed Aug. 19, 2014, 6 pgs.
Office Action (with English translation) for Japanese Patent Application No. 2011-173159, mailed Sep. 1, 2014, 6 pgs.
Office Action (with English translation) for Japanese Patent Application No. 2011-173159, mailed Jul. 16, 2013, 9 pages.
Notice of Allowance for Japanese Patent Application No. 2011-173159, mailed Feb. 9, 2015, 3 pgs.
Notice of Allowance for U.S. Appl. No. 13/104,468, mailed Dec. 18, 2014, 5 pgs.

\* cited by examiner

TOP SIDE

BOTTOM SIDE

I/O SYSTEMS, METHODS AND DEVICES FOR INTERFACING A PUMP CONTROLLER

CROSS-REFERENCE TO RELATED APPLICATION(S)

This application is a continuation of, and claims a benefit of priority under 35 U.S.C. 120 of the filing date of U.S. patent application Ser. No. 11/602,449 filed Nov. 20, 2006, now U.S. Pat. No. 7,940,664 entitled "I/O SYSTEMS, METHODS AND DEVICES FOR INTERFACING A PUMP CONTROLLER," which claims priority from U.S. Provisional Patent Application No. 60/741,657, filed Dec. 2, 2005, entitled "I/O INTERFACE SYSTEM AND METHOD FOR A PUMP," both of which are incorporated herein by reference for all purposes.

TECHNICAL FIELD OF THE INVENTION

This invention relates generally fluid pumps. More particularly, embodiments of the present invention relate to input/out systems, methods, and apparatuses for interfacing a pump controller with various devices.

BACKGROUND OF THE INVENTION

There are many applications for which precise control over the amount and/or rate at which a fluid is dispensed by a pumping apparatus is necessary. In semiconductor processing, for example, it is important to control the amount and rate at which photochemicals, such as photoresist chemicals, are applied to a semiconductor wafer. The coatings applied to semiconductor wafers during processing typically require a certain flatness and/or even thickness across the surface of the wafer that is measured in angstroms. The rates at which processing chemicals are applied (i.e., dispensed) onto the wafer have to be controlled carefully to ensure that the processing liquid is applied uniformly.

Photochemicals used in the semiconductor industry today are typically very expensive, costing as much as $1000 and up per a liter. Therefore, it is highly desirable to ensure that a minimum but adequate amount of chemical is used and that the chemical is not damaged by the pumping apparatus. Current multiple stage pumps can cause sharp pressure spikes in the liquid. Such pressure spikes and subsequent drops in pressure may be damaging to the fluid (i.e., may change the physical characteristics of the fluid unfavorably) and/or adversely affect the performance of the pumping system. Additionally, pressure spikes can lead to built up fluid pressure that may cause a dispense pump to dispense more fluid than intended or dispense the fluid in a manner that has unfavorable dynamics.

One shortcoming of prior pumps is interfacing the pump controller with other devices. The pump controller typically receives signals from a control system (e.g., other computers/tools) to receive process parameters, trigger signals or other signals and sends signals to indicate the state of a dispense cycle or other data. Many computers/manufacturing tools, however, use different physical interfaces and signaling schemes to communicate signals to and receive signals from a pump. Generally, for each input/output line, the pumping system requires one conductor leading to the pump controller. This means customizing the pump controller for a pump for the specific interface on another device to/from which the pump communicates data. In semiconductor manufacturing systems which generally use a large number of pump signals this can lead to complicated wiring leading to a single pump. Moreover, in many semiconductor manufacturing systems, there are multiple pumps stacked together, leading to a complicated array of wires leading to the pumps. Another shortcoming of prior systems was that the discrete input/output ("I/O") lines were limited in length. There is a need for new and better ways to interface devices with the pumps. Embodiments of the invention can address this need and more.

SUMMARY OF THE INVENTION

Embodiments of the present invention provide new I/O systems, methods, and apparatuses for interfacing pump controller(s) with various devices. More particularly, embodiments of the present invention provide an I/O system and method for interfacing pump controller(s) with external control device(s) which may have different interfaces and/or signaling formats.

In one embodiment, at least one I/O interface module is positioned between a pumping system and at least one programmed device such as a computer running a particular pump software application, a man-machine interface device, or a manufacturing tool for monitoring/controlling the pumping system. In one embodiment, the pumping system implements a single or multiple stage ("multi-stage") pump having a pump controller coupled thereto. The pump controller is configured to control the valve and motor timings of the pump directly and locally in accordance with the signals from the control device.

In embodiments of the invention, the I/O interface module can be implemented on a circuit board having thereon a processor and a memory. The circuit board has at least two data communications interfaces, one for communicating with the pump controller and one for communicating with the control device. These data communications interfaces can be customized to suit, depending upon implementation.

In some embodiments of the present invention, a single I/O interface module can be implemented. In one embodiment, the I/O interface module can include a first data communications interface to connect to a pump controller and a second data communications interface to connect to a control device (e.g., a computer, a manufacturing tool, a man-machine interface device, or the like) external to the pump. One example of this embodiment is described below with reference to FIG. 7.

In one embodiment, the I/O interface module can include more than two data communications interfaces to connect to a pump controller, a man-machine interface device, and one or more manufacturing tools. The I/O interface module can receive discrete signals from the control device(s) and interpret them accordingly (e.g., formulating or packetizing data corresponding to the discrete signals into one or more packets, prioritizing commands from various control devices, etc.). The I/O interface module can send the packets serially to the pump controller. The pump controller according to one embodiment of the present invention can read the packets and take appropriate actions at the pump (e.g., implementing appropriate processes at the pump and moving the dispense motor, etc.). Additionally, the pump controller can send packets of data to the I/O interface module serially. The I/O interface module can interpret or otherwise assert corresponding discrete signals to the control device(s). One example of this embodiment is described below with reference to FIG. 8.

In embodiments of the invention, the I/O interface module can interface with the control device via RS232, RS485, RS422 or other interfaces, can include analog inputs and outputs, DVC interface, or retrofit interfaces. The I/O interface module is customizable without changing pump hardware. Further, the I/O interface module can be tailored to each user's particular need to send signals to and receive signals from a pump. The I/O interface module allows a variety of interfaces and control schemes to be implemented with a particular pump without changing the hardware of the pump. According to one embodiment, regardless of the interfaces and communications protocols used between the I/O interface module and the control device, the I/O interface module streams serial packetized data over a high speed SPI serial bus to the pump controller.

Advantages provided by embodiments of the present invention can be numerous. As an example, by interpreting and asserting signals for the pump controller and the control device, the I/O interface module can reduce the number of discrete lines that otherwise would have been required in a direction connection configuration, thus greatly reducing cabling.

The reduction in cabling requirements provides the additional advantages of space saving, which can be an important factor in miniaturizing a pumping system, and cost saving, which can be highly desirable in just about any application.

Another advantage of the I/O interface module is that it eliminates the distance limitation imposed by discrete lines and allows for longer connections between the pumping system and the control device.

Other advantages of the embodiments of the I/O system disclosed herein include versatility and adaptability. Since the data communications interface of the I/O interface module can be customized to connect to the data communications interface of the control device, the control device and/or control schemes can be replaced or otherwise modified without having to change the hardware of the pump. Furthermore, since the data communications interface of the I/O interface module can be customized to connect to the data communications interface of the pump controller, the pump or its hardware can be replaced or otherwise modified without having to qualify the entire pump and/or re-arbitrate the pump to establish communication between the control device and the new pump. Moreover, embodiments of the invention advantageously allow the logic for controlling the pump to be allocated among two or more I/O interface modules or between a plurality of I/O interface modules and a plurality of pump controllers in various configurations without being limited by the processing power of the pump controllers.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the present invention are described below with reference to the figures which are not necessarily drawn to scale and where like numerals are used to refer to like and corresponding parts of the various drawings.

Embodiments of the present invention are directed to pump controllers in pumping systems. Such a pumping system may employ a multiple stage ("multi-stage") pump for feeding and accurately dispensing fluid onto wafers during a semiconductor manufacturing process. Particularly, embodiments of the present invention provide input/output ("I/O") interface systems, methods, and devices for interfacing a pump controller with various devices. It should be noted that the pumping system embodying such a pump controller as described herein are provided by way of example, but not limitation, and embodiments of the present invention can be utilized and/or suitably implemented for other designs and configurations. Specifically, embodiments of the invention can be applied to various pumps, including single stage and multi-stage pumps. An exemplary pumping system will first be described below before describing in detail embodiments of I/O systems, methods, and devices for interfacing the pump controller of the pumping system with various devices.

Figure 1:
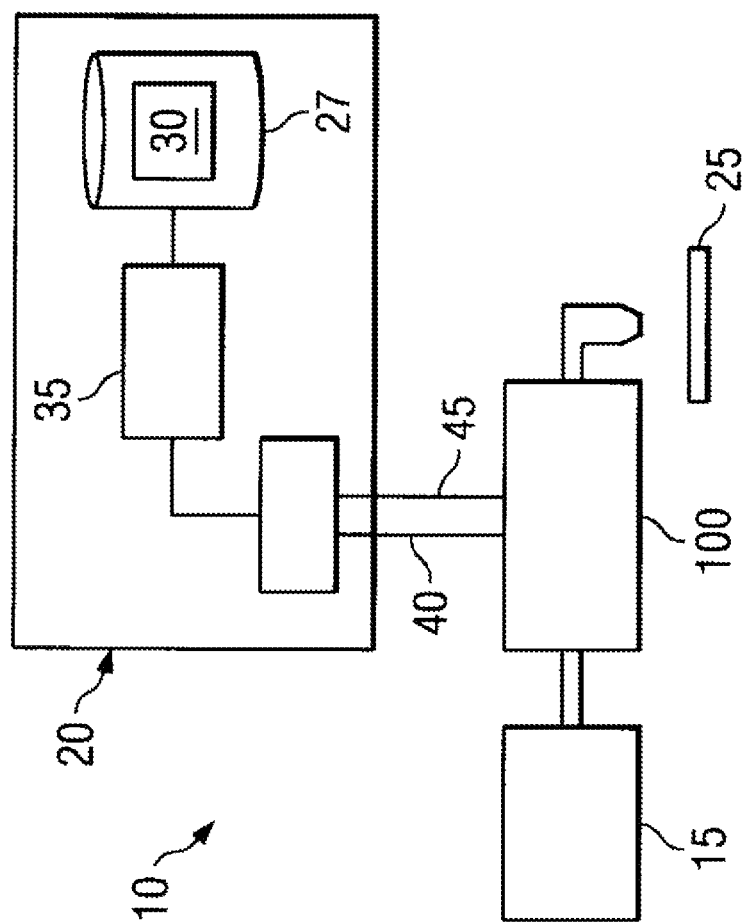
FIG. 1 is a diagrammatic representation of one embodiment of a pumping system.

FIG. 1 is a diagrammatic representation of a pumping system 10. The pumping system 10 can include a fluid source 15, a pump controller 20 and a pump 100, which work together to dispense fluid onto a wafer 25. Embodiments of the I/O interface systems, methods, and modules described herein with reference to FIGS. 7-8 and 11-14 can be used to connect one or more pump controller 20 to a variety of interfaces, devices, and manufacturing tools.

The operation of pump 100 can be controlled by pump controller 20, which can be onboard pump 100 or connected to pump 100 via a one or more communications links for communicating control signals, data or other information. Additionally, the functionality of pump controller 20 can be distributed between an onboard controller and another controller, including an I/O interface controller onboard an I/O interface module external to pump 100.

Pump controller 20 can include a computer readable medium 27 (e.g., RAM, ROM, Flash memory, optical disk, magnetic drive or other computer readable medium) containing a set of control instructions 30 for controlling the operation of pump 100. A processor 35 (e.g., CPU, ASIC, RISC or other processor) can execute the instructions. One example of a processor is the Texas Instruments TMS320F2812PGFA 16-bit DSP (Texas Instruments is Dallas, Tex. based company).

In the example of FIG. 1, pump controller 20 communicates with pump 100 via communications links 40 and 45. Communications links 40 and 45 can be networks (e.g., Ethernet, wireless network, global area network, DeviceNet network or other network known or developed in the art), a bus (e.g., SCSI bus) or other communications link. Controller 20 can be implemented as an onboard PCB board, remote controller or in other suitable manner. Pump controller 20 can include appropriate interfaces (e.g., network interfaces, I/O interfaces, analog to digital converters and other components) for communicating with pump 100. Additionally, pump controller 20 can include a variety of computer components known in the art including processors, memories, interfaces, display devices, peripherals or other computer components not shown for the sake of simplicity. Pump controller 20 can control various valves and motors in pump 100 to cause pump 100 to accurately dispense fluids, including low viscosity fluids (i.e., less than 5 centipoire) or other fluids.

Figure 2:
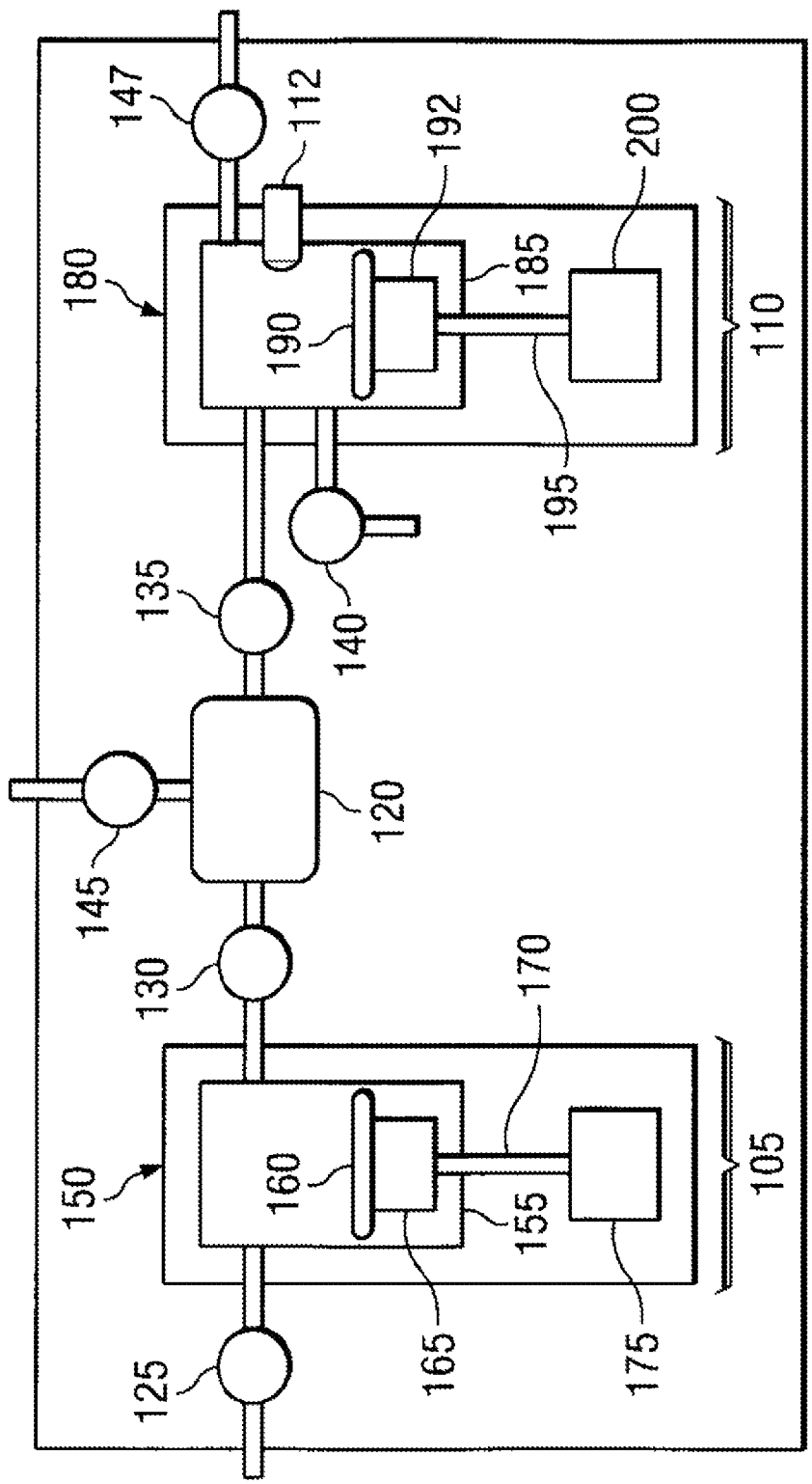
FIG. 2 is a diagrammatic representation of a multiple stage pump ("multi-stage pump") for the pumping system of FIG. 1.

FIG. 2 is a diagrammatic representation of a pump 100. In this example, pump 100 is a multi-stage pump and includes a feed stage portion 105 and a separate dispense stage portion 110. Located between feed stage portion 105 and dispense stage portion 110, from a fluid flow perspective, is filter 120 to filter impurities from the process fluid. A number of valves can control fluid flow through pump 100 including, for example, inlet valve 125, isolation valve 130, barrier valve 135, purge valve 140, vent valve 145 and outlet valve 147. Dispense stage portion 110 can further include a pressure sensor 112 that determines the pressure of fluid at dispense stage 110. The pressure determined by pressure sensor 112 can be used to control the speed of the various pumps as described below. Example pressure sensors include ceramic and polymer piezoresistive and capacitive pressure sensors, including those manufactured by Metallux AG, of Korb, Germany. The face of pressure sensor 112 that contacts the process fluid can be Teflon®.

Feed stage 105 and dispense stage 110 can include rolling diaphragm pumps to pump fluid in pump 100. Feed-stage diaphragm pump 150 ("feed pump 150"), for example, includes a feed chamber 155 to collect fluid, a feed stage diaphragm 160 to move within feed chamber 155 and displace fluid, a piston 165 to move feed stage diaphragm 160, a lead screw 170 and a stepper motor 175. Lead screw 170 couples to stepper motor 175 through a nut, gear or other mechanism for imparting energy from the motor to lead screw 170. Feed motor 170 rotates a nut that, in turn, rotates lead screw 170, causing piston 165 to actuate. Dispense-stage pump 180 ("dispense pump 180") can similarly include a dispense chamber 185, a dispense stage diaphragm 190, a piston 192, a lead screw 195, and a dispense motor 200. Dispense motor 200 can drive lead screw 195 through a threaded nut (e.g., a Torlon or other material nut).

During operation of pump 100, the valves of pump 100 are opened or closed to allow or restrict fluid flow to various portions of pump 100. These valves can be pneumatically actuated (i.e., gas driven) diaphragm valves that open or close depending on whether pressure or a vacuum is asserted. However, any suitable valve can be used.

The following provides a summary of various stages of operation of pump 100. However, pump 100 can be controlled according to a variety of control schemes including, but not limited to those described in U.S. Provisional Patent Application Ser. No. 60/741,682, filed Dec. 5, 2005, entitled "SYSTEM AND METHOD FOR PRESSURE COMPENSATION IN A PUMP" by Inventors Cedrone et al.; U.S. patent application Ser. No. 11/502,729, filed Aug. 11, 2006, Entitled "SYSTEMS AND METHODS FOR FLUID FLOW CONTROL IN AN IMMERSION LITHOGRAPHY SYSTEM" by inventors Clarke et al.; U.S. patent application Ser. No. 11/602,472 filed Nov. 20, 2006, entitled "SYSTEM AND METHOD FOR CORRECTING FOR PRESSURE VARIATIONS USING A MOTOR" by Inventors Gonnella et al.; U.S. patent application Ser. No. 11/292,559, filed Dec. 2, 2005, entitled "SYSTEM AND METHOD FOR CONTROL OF FLUID PRESSURE" by Inventors Gonnella et al.; U.S. patent application Ser. No. 11/364,286, filed Feb. 28, 2006, entitled "SYSTEM AND METHOD FOR MONITORING OPERATION OF A PUMP" by Inventors Gonnella et al., each of which is fully incorporated by reference herein, to sequence valves and control pressure. According to one embodiment, pump 100 can include a ready segment, dispense segment, fill segment, pre-filtration segment, filtration segment, vent segment, purge segment and static purge segment. During the feed segment, inlet valve 125 is opened and feed stage pump 150 moves (e.g., pulls) feed stage diaphragm 160 to draw fluid into feed chamber 155. Once a sufficient amount of fluid has filled feed chamber 155, inlet valve 125 is closed. During the filtration segment, feed-stage pump 150 moves feed stage diaphragm 160 to displace fluid from feed chamber 155. Isolation valve 130 and barrier valve 135 are opened to allow fluid to flow through filter 120 to dispense chamber 185. Isolation valve 130, according to one embodiment, can be opened first (e.g., in the "pre-filtration segment") to allow pressure to build in filter 120 and then barrier valve 135 opened to allow fluid flow into dispense chamber 185. During the filtration segment, dispense pump 180 can be brought to its home position. As described in U.S. Provisional Patent Application No. 60/630,384, entitled "SYSTEM AND METHOD FOR A VARIABLE HOME POSITION DISPENSE SYSTEM" by Layerdiere, et al., filed Nov. 23, 2004 and PCT Application No. PCT/US2005/042127, entitled "SYSTEM AND METHOD FOR VARIABLE HOME POSITION DISPENSE SYSTEM", by Layerdiere et al., filed Nov. 21, 2005, which are incorporated herein by reference, the home position of the dispense pump can be a position that gives the greatest available volume at the dispense pump for the dispense cycle, but is less than the maximum available volume that the dispense pump could provide. The home position is selected based on various parameters for the dispense cycle to reduce unused hold up volume of pump 100. Feed pump 150 can similarly be brought to a home position that provides a volume that is less than its maximum available volume.

At the beginning of the vent segment, isolation valve 130 is opened, barrier valve 135 closed and vent valve 145 opened. In another embodiment, barrier valve 135 can remain open during the vent segment and close at the end of the vent segment. During this time, if barrier valve 135 is open, the pressure can be understood by the controller because the pressure in the dispense chamber, which can be measured by pressure sensor 112, will be affected by the pressure in filter 120. Feed-stage pump 150 applies pressure to the fluid to remove air bubbles from filter 120 through open vent valve 145. Feed-stage pump 150 can be controlled to cause venting to occur at a predefined rate, allowing for longer vent times and lower vent rates, thereby allowing for accurate control of the amount of vent waste. If feed pump is a pneumatic style pump, a fluid flow restriction can be placed in the vent fluid path, and the pneumatic pressure applied to feed pump can be increased or decreased in order to maintain a "venting" set point pressure, giving some control of an other wise uncontrolled method.

At the beginning of the purge segment, isolation valve 130 is closed, barrier valve 135, if it is open in the vent segment, is closed, vent valve 145 closed, and purge valve 140 opened and inlet valve 125 opened. Dispense pump 180 applies pressure to the fluid in dispense chamber 185 to vent air bubbles through purge valve 140. During the static purge segment, dispense pump 180 is stopped, but purge valve 140 remains open to continue to vent air. Any excess fluid removed during the purge or static purge segments can be routed out of pump 100 (e.g., returned to the fluid source or discarded) or recycled to feed-stage pump 150. During the ready segment, isolation valve 130 and barrier valve 135 can be opened and purge valve 140 closed so that feed-stage pump 150 can reach ambient pressure of the source (e.g., the source bottle). According to other embodiments, all the valves can be closed at the ready segment.

During the dispense segment, outlet valve 147 opens and dispense pump 180 applies pressure to the fluid in dispense chamber 185. Because outlet valve 147 may react to controls slower than dispense pump 180, outlet valve 147 can be opened first and some predetermined period of time later dispense motor 200 started. This prevents dispense pump 180 from pushing fluid through a partially opened outlet valve 147. Moreover, this prevents fluid moving up the dispense nozzle caused by the valve opening (it's a mini-pump), followed by forward fluid motion caused by motor action. In other embodiments, outlet valve 147 can be opened and dispense begun by dispense pump 180 simultaneously.

An additional suckback segment can be performed in which excess fluid in the dispense nozzle is removed. During the suckback segment, outlet valve 147 can close and a secondary motor or vacuum can be used to suck excess fluid out of the outlet nozzle. Alternatively, outlet valve 147 can remain open and dispense motor 200 can be reversed to such fluid back into the dispense chamber. The suckback segment helps prevent dripping of excess fluid onto the wafer.

Figure 3:
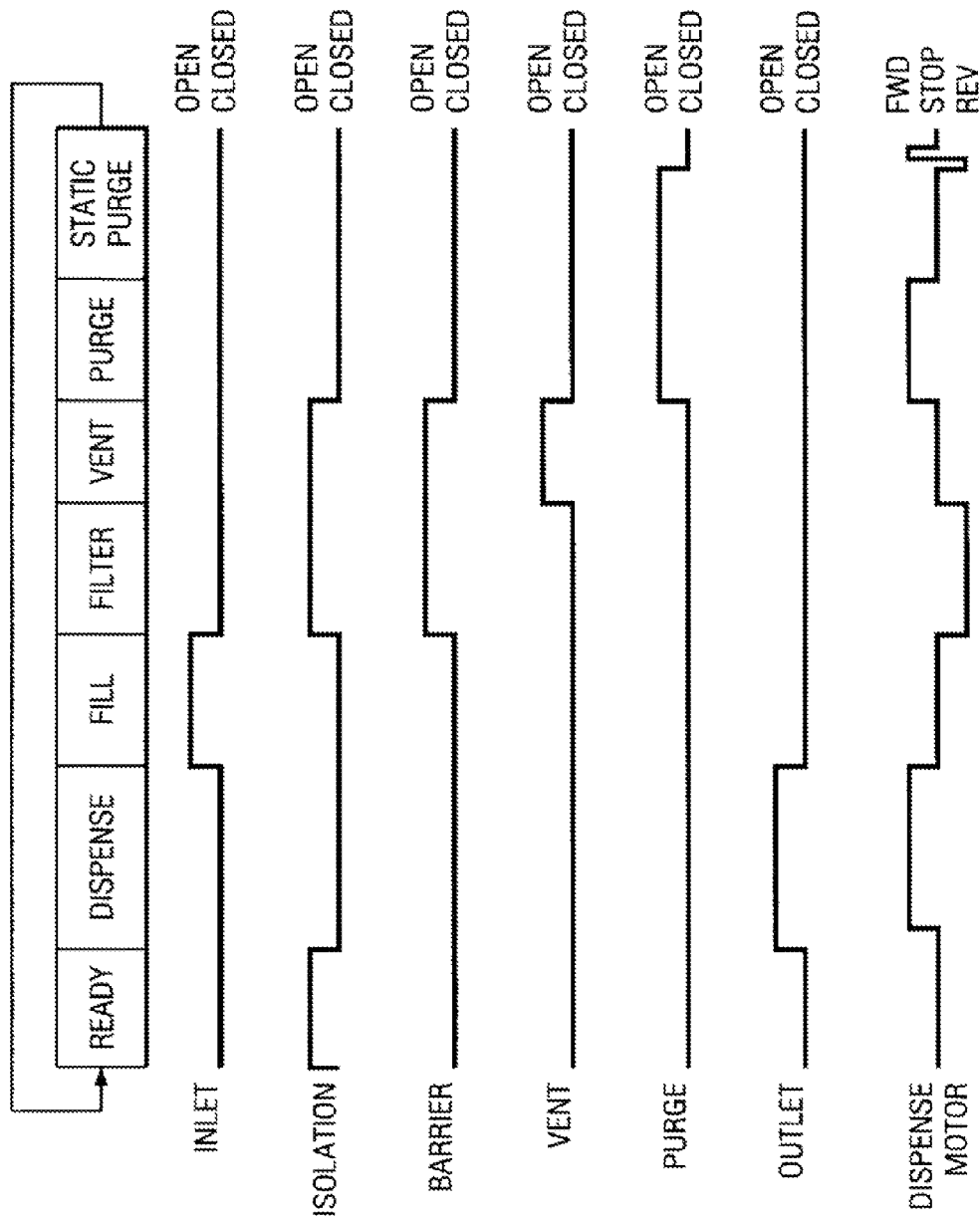
FIG. 3 is a diagrammatic representation of valve and motor timings for a multi-stage pump.

Embodiments of pump 100 may employ various pump control mechanisms and valve timings to help reduce deleterious effects of pressure on a process fluid. FIG. 3 is a diagrammatic representation of exemplary valve and dispense motor timings for various segments of the multi-stage operation of pump 100 of FIG. 2. Other sequences of operation are possible. While several valves are shown as closing simultaneously during segment changes, the closing of valves can be timed slightly apart (e.g., 100 milliseconds) to reduce pressure spikes. For example, between the vent and purge segment, isolation valve 130 can be closed shortly before vent valve 145. It should be noted, however, other valve timings can be utilized in various embodiments of the present invention. Additionally, several of the segments can be performed together (e.g., the fill/dispense stages can be performed at the same time, in which case both the inlet and outlet valves can be open in the dispense/fill segment). It should be further noted that specific segments do not have to be repeated for each cycle. For example, the purge and static purge segments may not be performed every cycle. Similarly, the vent segment may not be performed every cycle.

The opening and closing of various valves can cause pressure spikes in the fluid within pump 100. Because outlet valve 147 is closed during the static purge segment, closing of purge valve 140 at the end of the static purge segment, for example, can cause a pressure increase in dispense chamber 185. This can occur because each valve may displace a small volume of fluid when it closes. More particularly, in many cases before a fluid is dispensed from chamber 185 a purge cycle and/or a static purge cycle is used to purge air from dispense chamber 185 in order to prevent sputtering or other perturbations in the dispense of the fluid from pump 100. At the end of the static purge cycle, however, purge valve 140 closes in order to seal dispense chamber 185 in preparation for the start of the dispense. As purge valve 140 closes it forces a volume of extra fluid (approximately equal to the hold-up volume of purge valve 140) into dispense chamber 185, which, in turn, causes an increase in pressure of the fluid in dispense chamber 185 above the baseline pressure intended for the dispense of the fluid. This excess pressure (above the baseline) may cause problems with a subsequent dispense of fluid. These problems are exacerbated in low pressure applications, as the pressure increase caused by the closing of purge valve 140 may be a greater percentage of the baseline pressure desirable for dispense.

More specifically, because of the pressure increase that occurs due to the closing of purge valve 140 a "spitting" of fluid onto the wafer, a double dispense or other undesirable fluid dynamics may occur during the subsequent dispense segment if the pressure is not reduced. Additionally, as this pressure increase may not be constant during operation of pump 100, these pressure increases may cause variations in the amount of fluid dispensed, or other characteristics of the dispense, during successive dispense segments. These variations in the dispense may in turn cause an increase in wafer scrap and rework of wafers. To account for unwanted pressure increases to the fluid in dispense chamber 185, during the static purge segment dispense motor 200 may be reversed to back out piston 192 a predetermined distance to compensate for any pressure increase caused by the closure of barrier valve 135, purge valve 140 and/or any other sources which may cause a pressure increase in dispense chamber 185.

The above-described pump control mechanisms provide pump 100 with gentle fluid handling characteristics. By compensating for pressure fluctuations in a dispense chamber before a dispense segment, potentially damaging pressure spikes can be avoided or mitigated. Other pump control mechanisms and valve timings may also be utilized or otherwise implemented to help reduce undesirable effects of pressure on a process fluid.

Figure 4:
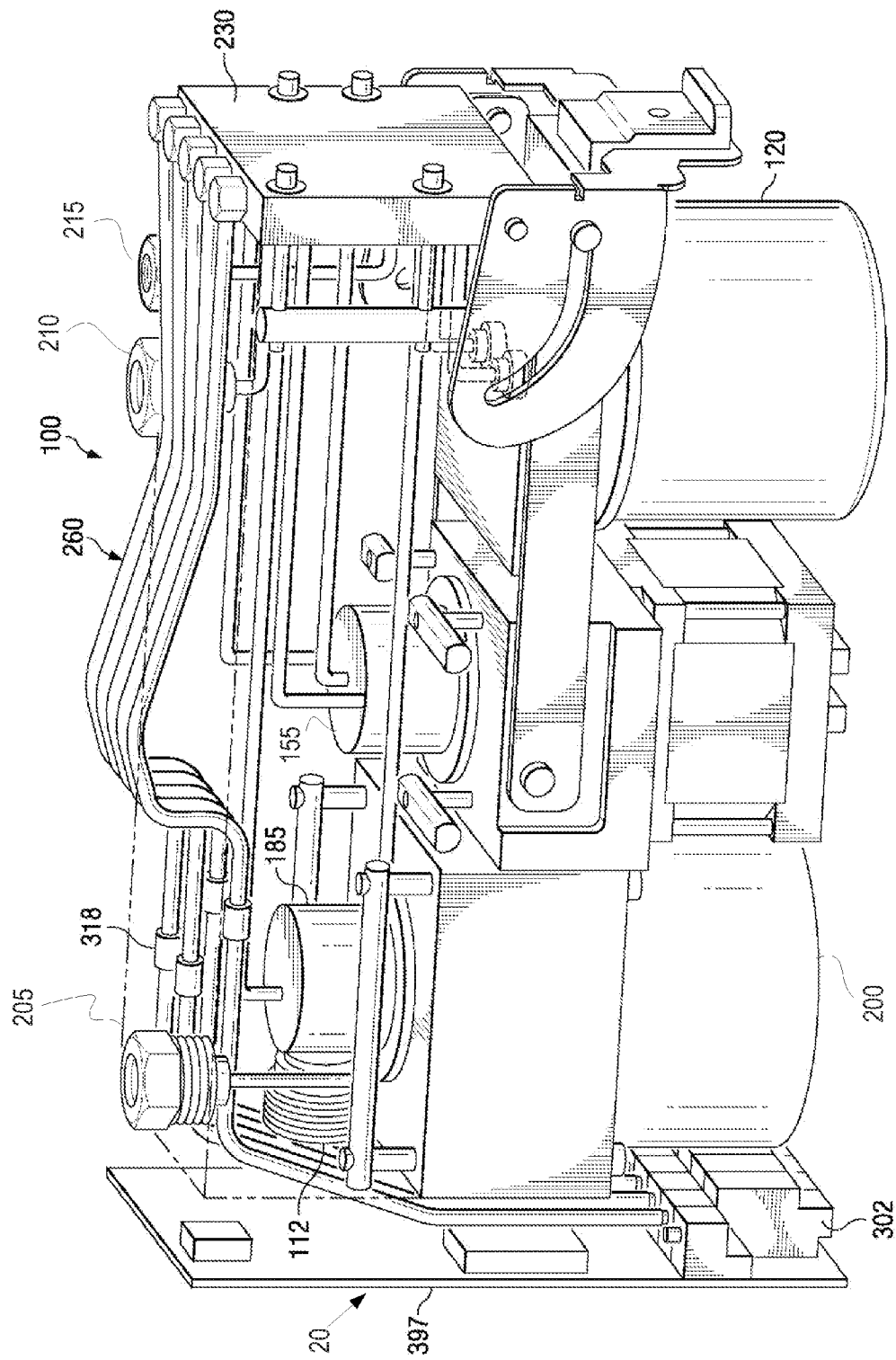
FIG. 4 is a illustration of one embodiment of a pump controller implemented as a PCB board onboard a pump.

FIG. 4 is a diagrammatic representation of one embodiment of a pump assembly for pump 100. Pump 100 can include a dispense block 205 that defines various fluid flow paths through pump 100 and at least partially defines feed chamber 155 and dispense chamber 185. Dispense pump block 205 can be a unitary block of PTFE, modified PTFE or other material. Because these materials do not react with or is minimally reactive with many process fluids, the use of these materials allows flow passages and pump chambers to be machined directly into dispense block 205 with a minimum of additional hardware. Dispense block 205 consequently reduces the need for piping by providing an integrated fluid manifold. Dispense block 205 can include various external inlets and outlets including, for example, inlet 210 through which the fluid is received, vent outlet 215 for venting fluid during the vent segment.

Supply lines 260 provide pressure or vacuum to valve plate 230, which has a plurality of valves configured to allow fluid to flow to various components of pump 100. Actuation of the valves is controlled by valve control manifold 302 that directs either pressure or vacuum to each supply line 260. Each supply line 260 can include a fitting (e.g., fitting 318) with a small orifice. This orifice may be of a smaller diameter (e.g., approximately 0.010 inches in diameter) than the diameter of the corresponding supply line 260 to which fitting 318 is attached. Thus, the orifice of fitting 318 may serve to place a restriction in supply line 260. The orifice in each supply line 260 helps mitigate the effects of sharp pressure differences between the application of pressure and vacuum to the supply line and thus may smooth transitions between the application of pressure and vacuum to the valve. In other words, the orifice helps reduce the impact of pressure changes on the diaphragm of the downstream valve. This allows the valve to open and close more smoothly which may lead to increased to smoother pressure transitions within the system which may be caused by the opening and closing of the valve and may in fact increase the longevity of the valve itself.

Valve control Manifold 302 can include a set of solenoid valves to selectively direct pressure/vacuum to valve plate 230. When a particular solenoid is on thereby directing vacuum or pressure to a valve, depending on implementation, the solenoid will generate heat. In this example, valve control manifold 302 is mounted to a printed circuit board ("PCB") 397, which is mounted on a back plate (not shown), away from dispense block 205 and particularly dispense chamber 185. This helps prevent heat from the solenoids in valve control manifold 302 from affecting fluid in dispense block 205. Such a back plate can be made of machined aluminum or other material that can act as a heat sink for pump 100, dissipating heat from valve control manifold 302 and PCB 397. Valve control manifold 302 can receive signals from PCB 397 to cause solenoids to open/close to direct vacuum/pressure to the various supply lines 260 to control the valves of pump 100. Again, as shown in FIG. 3, valve control manifold 302 can be located at the distal end of PCB 397 from dispense block 205 to reduce the affects of heat on the fluid in dispense block 205. Additionally, to the extent feasible based on PCB design and space constraints, components that generate heat can be placed on the side of PCB away from dispense block 205, again reducing the affects of heat.

Pump 100 includes several interfaces for communications with a pump controller (e.g., pump controller 20 of FIG. 1), which, in the example of FIG. 3, is implemented on PCB 397. Exemplary interfaces of pump 100 may include one or more wires (not shown) that enables pressure sensor 112 to communicate pressure readings to controller 20. Dispense motor 200 can include a motor control interface (not shown) to receive signals from pump controller 20 to cause dispense motor 200 to move. Additionally, dispense motor 200 can communicate information, including position information (e.g., from a position line encoder), to pump controller 20. Similarly, feed motor 175 can include a communications interface (not shown) to receive control signals from and communicate information to pump controller 20.

It should be noted that the pump 100 described above is provided by way of example, but not limitation, and embodiments of the present invention can be implemented for other pump configurations.

As discussed above, pump controller 20 can provide signals locally and/or internally to the various motors and the solenoid (i.e., to open/close the valves) and provide data to other devices (remote or external to pump controller 20) in a semiconductor manufacturing system. Previous versions of pump controllers use a serial connection and discrete input/output lines to communicate. The serial connection is used to transmit/receive data corresponding to a man-machine interface ("MMI"). The discrete lines, on the other hand, carry signals such as trigger signals, alarm signals, etc. Each discrete line is for a dedicated function and carries a signal having a particular purpose (e.g., a signal on the discrete line had a specific purpose or meaning to the pump controller).

For example, the changing of state on a particular discrete line (e.g., going from low to high or high to low) could indicate the start of dispense, whereas a signal on another discrete line could indicate the end of dispense.

Figure 5:
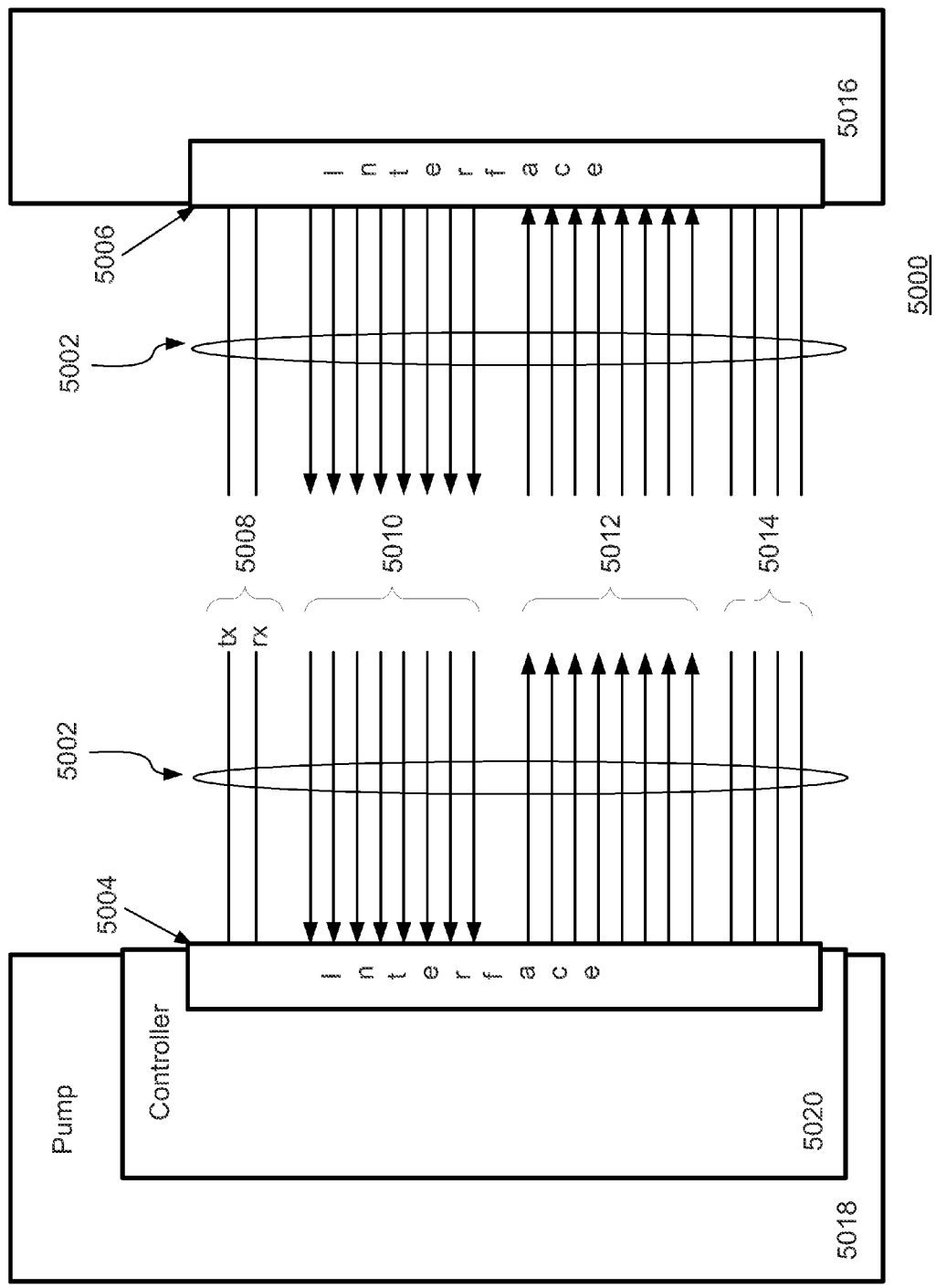
FIG. 5 is a diagrammatic representation of a prior solution for transferring data between a pump controller and an electronic device connected to the pump.

FIG. 5 illustrates a prior data communications system 5000 for transferring data between a pump 5018 and an external device 5016. Pump 5018 has a pump controller 5020 with a built-in interface 5004. Data communications interface 5004 can include serial connections 5008 for transmitting and receiving data, discrete input lines 5010 for carrying discrete inputs and discrete output lines 5012 for carrying discrete outputs. Additionally, data communications interface 5004 can include power and ground lines 5014. Device 5016 (e.g., a man-machine interface device such as a computer or a manufacturing tool) has a data communications interface 5006 which corresponds to data communications interface 5004. Serial connections 5008 can be used, for example, to communicate data related to device 5016. Discrete input lines 5010 can be used to transport discrete signals, such as Go, Stop, Clear Error Function, to pump 5018. Discrete outputs 5012 can be used to carry discrete signals, such as Ready, Error, Warning, to device 5016. Each discrete input line and discrete output carries a signal having a discrete meaning (e.g., a signal on a discrete line has a specified meaning to pump controller 5020). Thus, data communications interface 5004 as illustrated in FIG. 5 would require at least 22 lines. These lines may be bundled as a data communications medium 5002.

Figure 6:
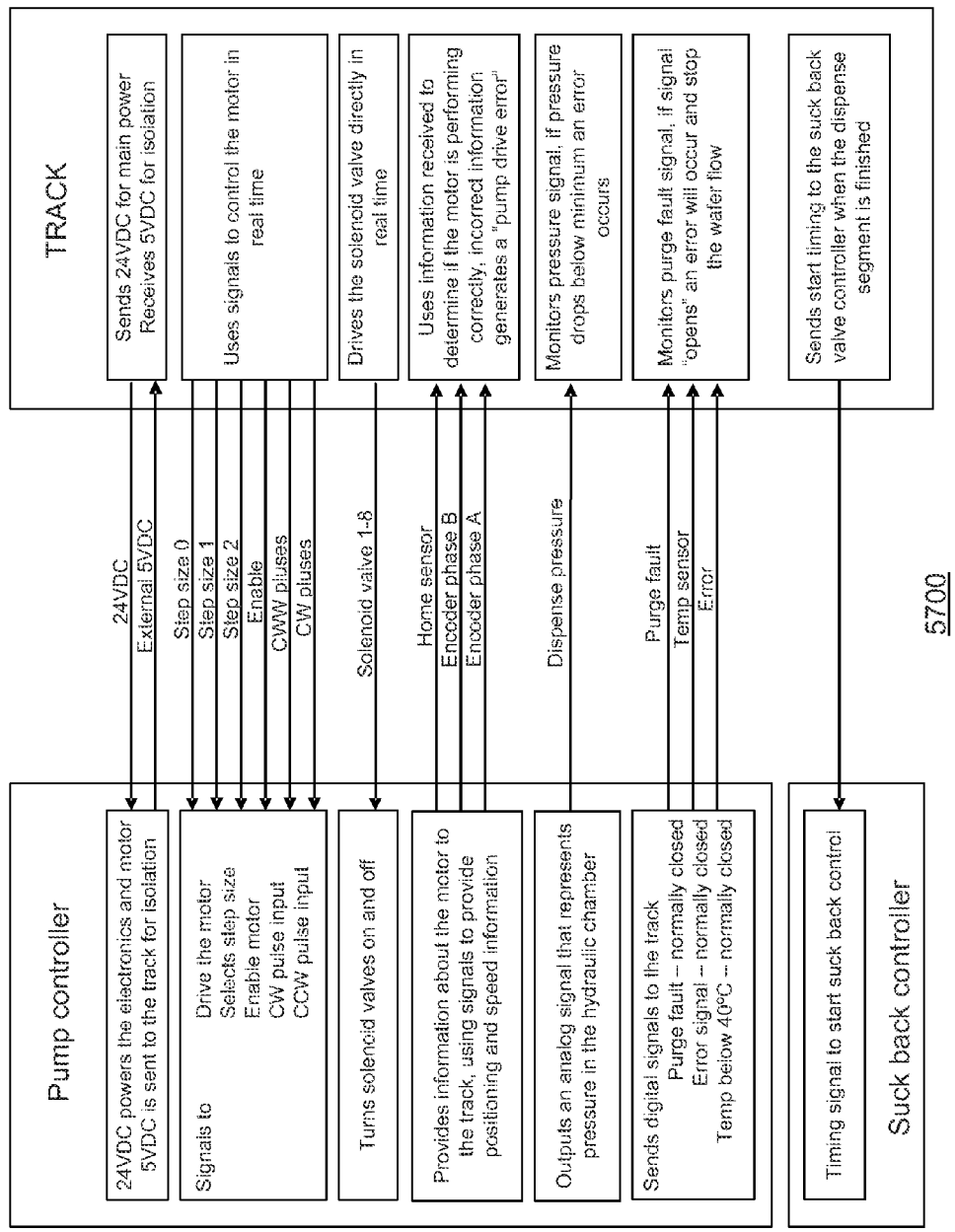
FIG. 6 is a block diagram representing one example of a prior solution for transferring data between a pump controller and a track device connected to the pump.

FIG. 6 is another example of a prior data communications system 5700 for transferring data between a pump controller and a track device. Similar to system 5000, system 5700 uses discrete lines to carry discrete signals between the pump controller and the track device (i.e., a manufacturing tool). As FIG. 6 exemplifies, there is a one-to-one correspondence of line communication between the pump controller and the track device. Additionally, because each data packet is sent directly to the pump controller, it is interpreted and acted upon in real time. Furthermore, changing the pump controller or the pump may mean that either or both the interface at the pump controller or/and the interface at the track device will have to be changed correspondingly.

Data communications system 5000 of FIG. 5 and system 5700 of FIG. 6 have several limitations. First, the number of conductors required (i.e., at least 22 in FIG. 5 and at least 17 in FIG. 6) makes the cable or cables for data communications interface 5004 bulky. In pumping systems with multiple pumps and/or limited footprint, this can be problematic as the cabling will take up valuable space. Additionally, the discrete lines are distance limited. As another limitation, data communications interface 5004 of FIG. 5 is limited to eight discrete inputs and eight discrete outputs. Therefore, if the tool or computer with which controller 5006 communicates requires more discrete signals, data communications interface 5004 and pump controller 5020 (i.e., the hardware at pump 5018) must be changed. As another limitation, prior developed pumps were typically connected to a network for data communications (e.g., an RS-232 network). If a pump experienced problems and had to be replaced, the entire replacement pump has to be reconfigured. For example, if a pump that uses 22 discrete lines is replaced with a pump that uses 17 discrete lines, not only the data communications interfaces will have to be changed, the entire replacement pump will have to be qualified and/or re-arbitrated on the network in order to function properly. This process could slow the time required for the replacement pump to come on-line.

Figure 7:
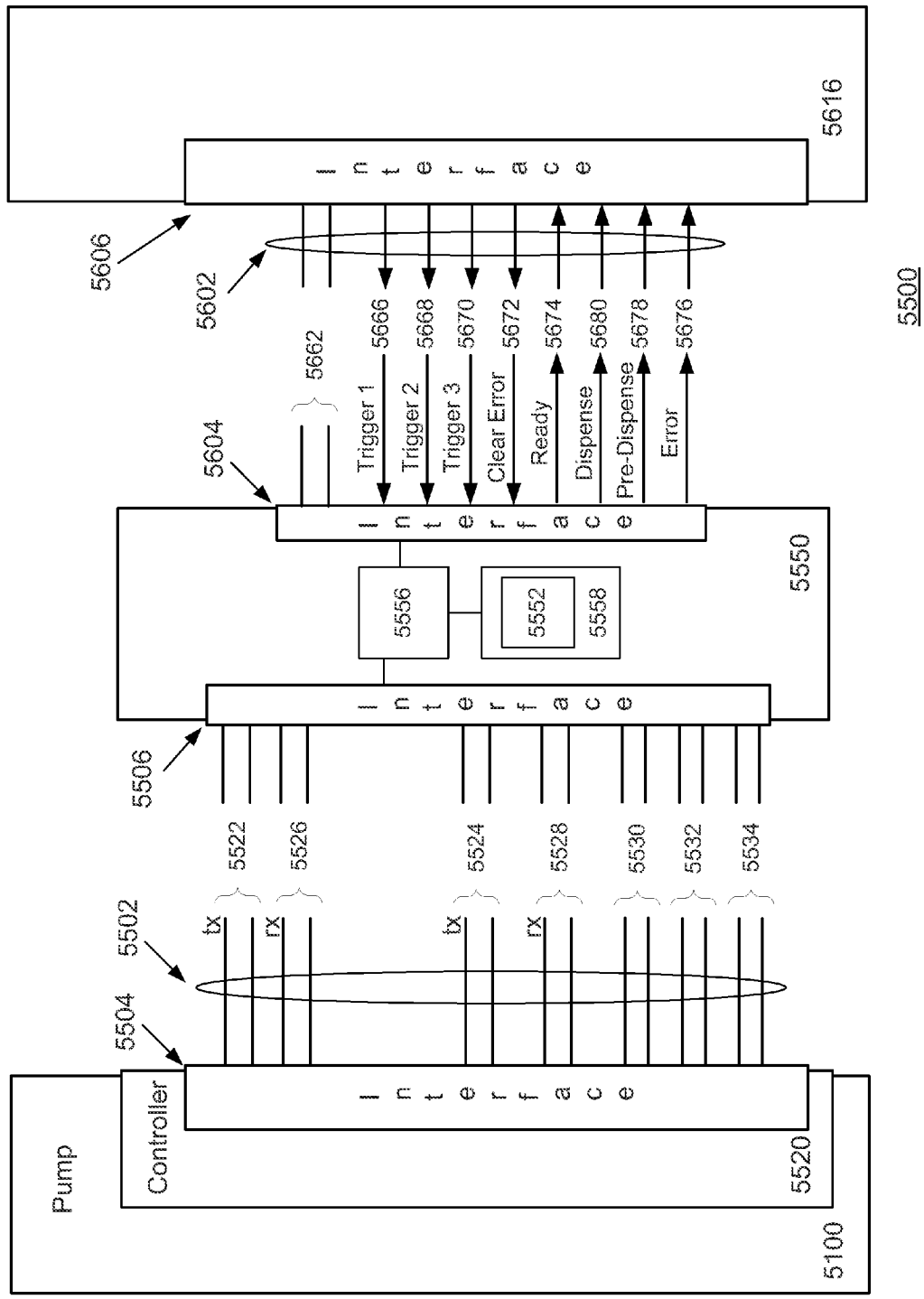
FIG. 7 is a diagrammatic representation of one embodiment of a system for interfacing a pump controller with other device(s)

Embodiments of the present invention address these limitations with a versatile I/O system, method, and device interfacing the pump with other device(s). FIG. 7 is a diagrammatic representation of one embodiment of an I/O system 5500 having an I/O interface device or module 5550 for interfacing a pump 5100 with a device 5616. In the embodiment of FIG. 7, pump 5100 comprises a pump controller 5520 which is similar to pump controller 20 as described above. Pump controller 5520 includes a data communications interface 5504 for communicating data to/from pump 5100. Data communications interface 5504 can include serial data transmission lines 5522 and 5524; serial data receive lines 5526 and 5528; clock lines 5530; slave enable lines 5532; and power/ground lines 5534.

Dispense process parameters, recipes, system variables and other process data can be transferred to/from pump controller 5520 on one set of serial lines (e.g., serial transmission lines 5522 and serial receive lines 5526). The other serial lines can be used to transmit, for example, triggers, error indications, and other pieces of data formerly carried as discrete signals. In one embodiment, these pieces of data are formed into a packet and transmitted serially over a second serial port. In the example shown in FIG. 7, clock lines 5530 carry synchronization clock signals and slave enable lines 5532 carry signals related to the transmission of data.

As can be noted, the configuration of FIG. 7 requires only 14 conductors. These lines can be bundled into a single cable 5502 or multiple cables. For example, data communications interface 5504 can connect through a standard 15-conductor cable that can extend in excess of three meters. It should be noted that the more or fewer serial communications lines can be used and discrete communications lines can also be used, depending on implementation.

I/O interface module 5550 comprises a first data communications interface 5506 and a second data communications interface 5604. As exemplified by FIG. 8, I/O interface module 5550 may be implemented to include a third data communications interface (not shown in FIG. 7). This third data communications interface may connect I/O interface module 5550 with a man-machine interface ("MMI") for programming and/or diagnostic purposes. First data communications interface 5506 corresponds to data communications interface 5504 of pump controller 5520. For example, data communications interface 5506 can also connect to the standard 15-conductor cable (e.g., cable 5502). Second data communications interface 5604 corresponds to data communications 5606 of device 5616. Second data communications interface 5604 does not have to match data communications interface 5504 of pump controller 5520 and can customized or otherwise configured to accept just about any cabling, including existing, standard, or customized pump cabling, into interface module 5550. Accordingly, cable 5602 connecting data communications interface 5604 and data communications interface 5602 can be standard or customized. For example, data communications interface 5604 can accept, by way of example, but not limitation, RS-232, RS-422 or RS-485. In this way, I/O interface module 5550 can interface the data communications interface of a pump with another type of interface used by the device communicating with the pump. Furthermore, I/O interface module 5550 can interface the pump with a network (e.g., an RS-232 network or other network).

I/O interface module 5550 can further include a processor 5556 (e.g., CPU, PIC, DSP, ASIC or other processor) and associated logic coupled to (i.e., capable of communicating with) first data communications interface 5506 and second data communications interface 5604. One example of a processor is a PIC PIC18F8720-1/PT 8-bit microcontroller by MICROCHIP Technology Inc. of Chandler, Ariz. A computer readable medium 5558 (e.g., RAM, ROM, Flash memory, EEPROM, magnetic storage, optical storage) or other computer readable medium can carry software or program instructions 5552 executable by processor 5556. It should be noted that computer readable medium 5558 can be onboard processor 5556. Furthermore, instructions 5552 are executable to translate data received on data communications interface 5604 to a format usable by pump controller 5520 and data received via data communications interface 5506 to a format usable by device 5616 connected via data communications interface 5604. For example, I/O interface module 5550 can include logic to map discrete line signals to bits in a packet for serial communication.

As an example, assume data communications interface 5604 includes serial communications lines 5662 to transfer process variables and other variable data (e.g., data associated with device 5616) to/from pump 5100, line 5666 for Trigger 1, line 5668 for Trigger 2, line 5670 for Trigger 3, line 5672 for Clear Error, line 5674 for the Ready signal, line 5676 for an Error Signal, line 5678 for a pre-dispense signal, and line 5680 for a dispense signal. When I/O interface module 5550 receives serial data via serial communications lines 5662, I/O interface module 5550 can pass the data to pump 5100 on serial communications lines 5526 with or without manipulation. When I/O interface module 5550 receives data on line 5666, 5668, 5670 or 5672, I/O interface module 5550 can set a corresponding bit in a packet and send the packet to pump 5100 on serial data lines 5526 or 5528.

Further assume, for example, that I/O interface module 5550 forms 12 byte packets with 4 bytes (i.e., 32 bits) reserved for transmitting data received over interface 5506 to pump 5100 and operates at 3 kHz. Each line (up to 32 lines in this case) can be assigned a bit in a packet. Thus, for example, when a signal is received on line 5666 indicating Trigger 1, I/O interface module 5550 can set the first data bit (or other bit corresponding to line 5066) in the next outgoing packet. When pump 5100 receives the packet, pump controller 5520 will read the bit and understand that Trigger 1 is being asserted and act correspondingly. In the opposite direction, pump controller 5520 can pass data, such as a Ready state, to I/O interface module 5550 in an appropriate bit (i.e., a data bit in the packet corresponding to line 5674). When I/O interface module 5550 receives the packet from pump 5100, I/O interface module 5550 can assert the appropriate state on line 5674. Thus, in this example, I/O interface module 5550 acts as a parallel to serial converter for pump data.

I/O interface module 5550, according to one embodiment, can be agnostic to the meaning of signals asserted on various lines and set in corresponding bits. For example, when I/O interface module 5550 receives a signal on line 5666, it simply sets the appropriate bit in the next outgoing packet to pump 5100. In this case, pump controller 5520 at pump 5100 is responsible for interpreting the received bit as Trigger 1. It should be noted that the software at pump 5100 can be user-configurable to interpret bits to correspond to certain states. For example, the software can be configured to use data bit one as the Trigger 1 bit or data bit five as the Trigger 1 bit. Thus, the software at pump 5100 can provide for flexibility in interpreting/forming the input/output packets.

Similarly, when I/O interface module 5550 receives a packet from pump 1500 with the bit corresponding to line 5674 set, I/O interface module 5550 can assert a signal on line 5674. In this case, device 5616 (to which the signal is asserted) is responsible for interpreting the signal to indicate the ready state. Other bits in the packets sent from I/O interface module 5550 can include, for example, the module type, addressing information or other information. According to other embodiments of the present invention, I/O interface module 5550 can include programming and/or suitable logic to interpret the bits set by pump 5100 or signals asserted on interface 5604 to take action in response to the bits/signals. In some embodiments, after a signal from device 5616 is received at I/O interface module 5550, the logic or intelligence to interpret and act on that signal is allocated between I/O interface module 5550 and pump controller 5520. The allocation could be distributed (e.g., 50-50) or optimized (e.g., a smart pump controller or a smart I/O interface module), depending upon implementation. For example, in some embodiments, I/O interface module 5550 simply provides serial-parallel data conversion, thus requiring very little computational power and memory. In some embodiments, I/O interface module 5550 can be configured (and correspondingly equipped) to perform most of the pump control functions. In this way, very little intelligence and hence computational power and memory is required at the pump controller. Such a pump controller would only need to handle the basic functions to control the motor(s) and valves locally. In some embodiments, I/O interface module 5550 can be configured (and correspondingly equipped) to service more than one pumps.

Figure 8:
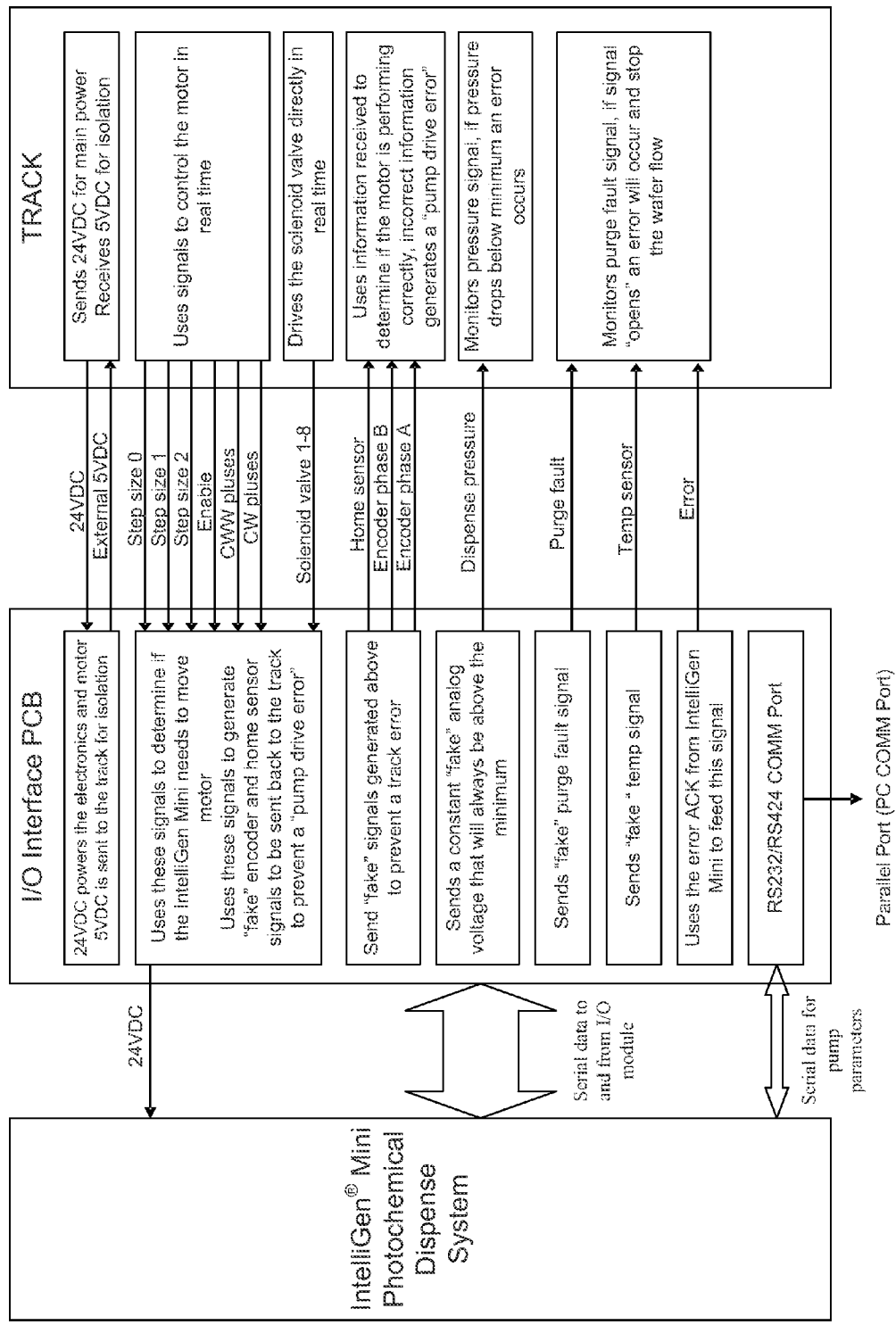
FIG. 8 is a block diagram representing one exemplary embodiment of a system and apparatus for interfacing a pump controller with other device(s)

FIG. 8 is a block diagram representing one exemplary embodiment of an I/O interface system 5800 comprising an I/O interface apparatus for interfacing a pump controller (e.g., the pump controller of the IntelliGen® Mini Photochemical Dispense System) with an external Track device. In this example, similar to PCB 397 of FIG. 3, the I/O interface apparatus of system 5800 is implemented on a PCB. Similar to I/O interface module 5550 of FIG. 7, the I/O interface PCB of system 5800 has a processor, a memory, instructions embodied on the memory, and two data communications interfaces, one interfacing the pump controller and one interfacing the track device. FIG. 8 illustrates, by example, that the I/O interface PCB has intelligence in interpreting and acting on data received. The I/O interface PCB of FIG. 8 can be readily customized to replace or work with just about any pump in the field. For example, the I/O interface PCB can use signals received from the track device to determine if the pump controller needs to move the motor. It can also use these signals to generate "fake" or simulated signals (e.g., encoder and home sensor signals) and send them back to the track device to prevent errors. The I/O interface PCB can be configured to send a constant "fake" analog voltage that will always be above the minimum dispense pressure. Other "fake" signals may include purge fault signal, temperature signal, etc. These "fake" signals can help in reducing errors and in calibrating the smooth and optimal operation of the pumping system. In addition to input/output functions, the I/O interface PCB can be configured to provide a variety of functions such as the serial-parallel conversion and network communications.

I/O interface systems 5500 and 5800 provide several advantages over previous pump control interface systems. First, different I/O interface modules can support different functionality. For example, in the above example, I/O interface module 5550 supports four discrete inputs and four discrete outputs. However, other interface modules could support more inputs and outputs. If a user wishes to support an additional function, rather than having to replace data communications interface 5504 and/or pump controller 5520 at pump 5100, the user would simply replace I/O interface module 5550 with a new or different version of the I/O interface module. Continuing with the previous example, if the user wishes to change from a four discrete input/output system to a five discrete input/output system, the user could simply replace I/O interface module 5550 with a new I/O interface module that supported five discrete lines. Furthermore, if the user changes computer systems and/or has a new physical interface, the user can change out I/O interface module 5550 with one that can accommodate the new physical interface and/or the new computer system(s) without needing to change any interface at the pump. This shortens the time it takes the new system (and hence the user) to establish/re-establish communications with the pump.

Another advantage provided by embodiments of the present invention is that the interface module can handle network addressing if the interface module is connected to other devices through a network (e.g., an RS-232 network). If the pump behind the interface module experiences problems and must be replaced, a new pump can be transparently connected to the old interface module. Because the network address is associated with the interface module rather than the pump, the network address does not have to be re-arbitrated when the new pump is added to replace the old pump.

Yet another advantage provided by embodiments of the present invention is to allow newer pumps, such as the pump described in U.S. Provisional Patent Application Ser. No. 60/742,435 filed Dec. 5, 2005, entitled "SYSTEM AND METHOD FOR MULTI-STAGE PUMP WITH REDUCED FORM FACTOR" by Inventors Cedrone et al., which is incorporated herein by reference, to interface with older control systems. For example, older multi-stage pump control systems would assert signals for each pump stage including motor signals. An interface module can translate these signals into packetized data and send the data packets to the pump over the 15-line cable. The pump software can read the data packet to determine which bits are set and take the appropriate action (e.g., close or open a valve, move a motor in forward or reverse etc.). Thus, a newer pump can be controlled by an older control system using a different physical interface and implementing an older control routine.

It should be noted that embodiments of the I/O interface modules disclosed herein may process the signals asserted by the control system to translate the signals into data usable by the pump. For example, a control system may simply assert a signal to move a motor clockwise or counter clockwise on particular lines as shown in FIG. 8. As another example, I/O interface module 5550 can translate the signal to move a motor clockwise or counter clockwise on particular lines into position data in the data packet. When the data packet is received at pump 5100, pump controller 5520 will read the appropriate bits to determine the new position of a motor (e.g., feed motor/dispense motor). Thus, there may not be a one-to-one correspondence between the data lines and bits in the packet (i.e., no discrete lines are necessary).

As the above example illustrates, a signal on a particular line received by I/O interface module 5550 may cause I/O processor or controller 5556 to perform some processing of the signal to set multiple bits. Similarly, multiple bits in a packet received from pump 5100 may be processed by I/O processor or controller 5556 to cause I/O interface module 5550 to assert a signal on a particular line or lines.

In some embodiments, I/O interface module 5550 is capable of performing analog-digital conversion. For example, I/O interface module 5550 can digitize analog signals to send information received in an analog form to pump 5100 in a packet and covert packetized data received from pump 5100 to an analog signal. Additionally, I/O interface module 5550 is capable of supporting some functions which may not be supported by pump 5100 and which may be expected by the computer or other device communicatively coupled to pump 5100. In this way, I/O interface module 5550 can virtualize the functionality for pump 5100 and assert appropriate signals to the external computer or device.

Figure 9:
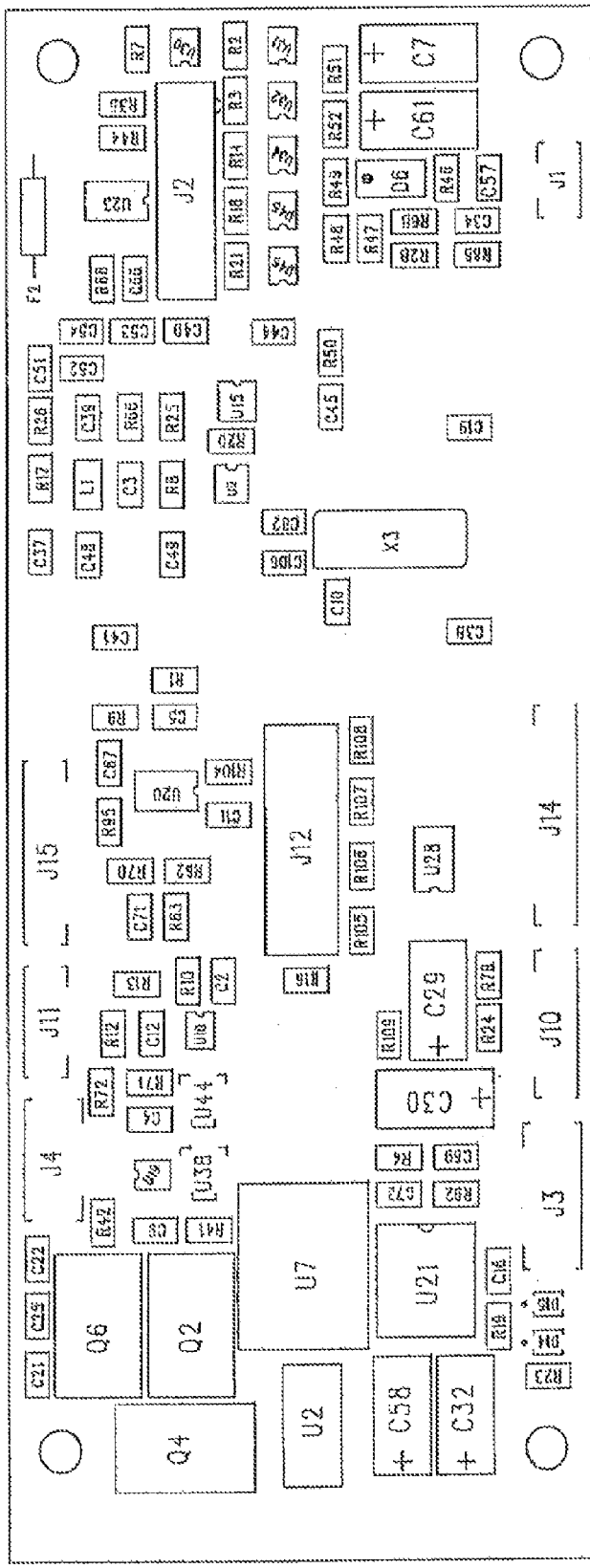
FIG. 9 is the top side view of a circuit board implementing one embodiment of a pump controller.
Figure 10:
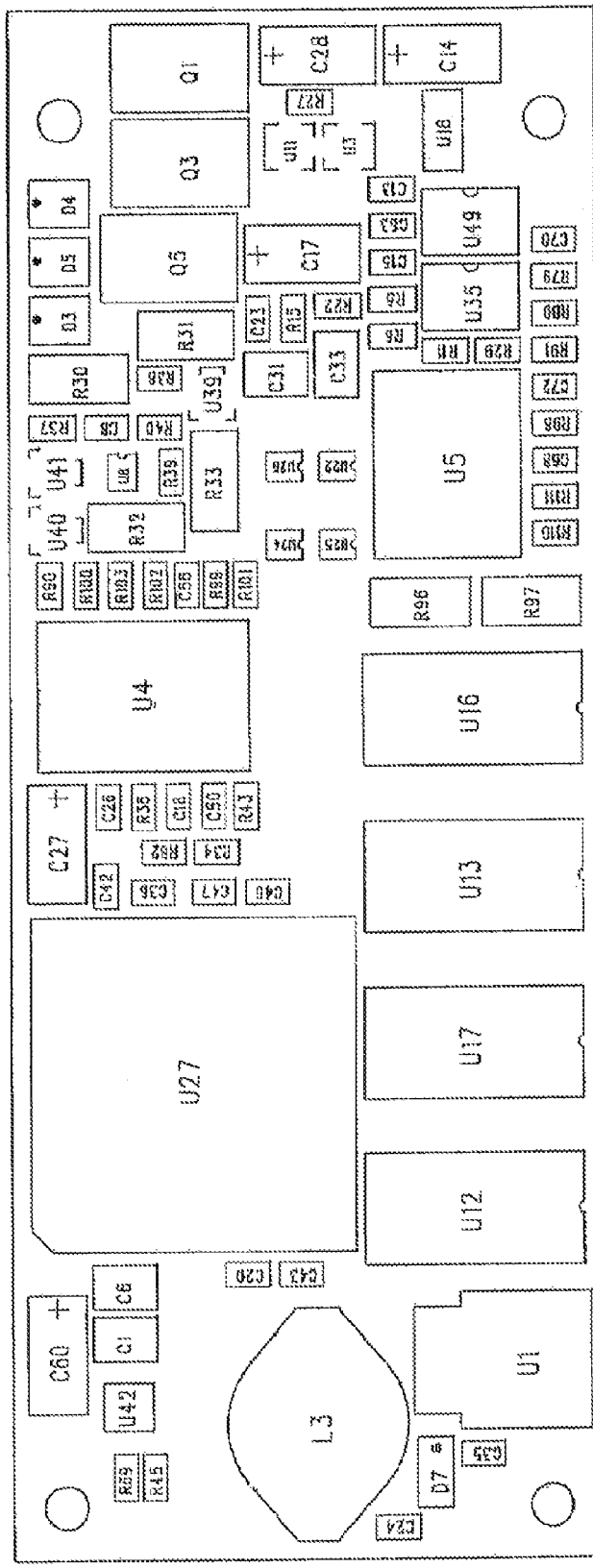
FIG. 10 is the bottom side view of the circuit board of FIG. 9.

FIG. 9 illustrates a first or top side 5920 of a PCB implementing one embodiment of pump controller 5520. FIG. 10 illustrates a second (bottom) side 5925 of the PCB of FIG. 9 implementing one embodiment of pump controller 5520. TABLE 1 below provides an example BOM for the PCB of FIG. 9 and FIG. 10:

TABLE 1

| Reference | Part Description | Part No. | Manufacturer | Value |
|---|---|---|---|---|
| C1 C6 | CAP, MLCC, 1210, 16 V, X5R, 10 uF ± 20%, T&R | C1210C106K3RAC | Kemet Corp. of Cleveland Ohio ("Kemet") | 10 uF low ESR |
| C2-5 C8-9 C11-13 C23-24 C26 C34-35 C50 C56 | CAPACITOR, Y5V, .01 uF, 0603, 25 V | C0603C103K5RAC | Kemet | .01 uF |
| C7 C14 C17 C29 C32 | CAPACITOR, TANT, 150 uF, CASE D, 16 V, 10% | T491X157M016AS | Kemet | 150 uF |
| C10 C15-16 C18-22 C25 C36-49 C51-54 C57 C63 C66-71 | CAPACITOR, Y5V, .1 uF, 0603, 25 V | GRM32DR71E106KA12L | MuRata | .1 uF |
| C27-28 C30 C58 C60-61 | CAPACITOR, TANT, 10 uF, CASE D, 35 V, 10% | 593D106X9035D2W | Vishay | 10 uF |
| C31 C33 | CAP, MLCC, 1210, 6.3 V, X5R, 47 uF ± 10%, T&R | C1210C476K9PAC | Kemet | 47 uF |
| C72-73 | CAPACITOR, .001 uF, 0603, 50 V | C0603C102K5RACTU | Kemet | .001 uF |
| C82 C106 | Cap | C0603C270F5GACTU | Kemet | 27 pF |
| D3-5 | 200 V 1 A HEXFRED Discrete Diode in a SMB package | MURS120 | IR (International Rectifier) | N/A |
| D6 | SCHOTTKY BARRIER DIODE | PRLL5819 | Phillips | N/A |
| D7 | 27 V Zener Diode, surface mount SOD87 | BZD27-C27 | Phillips | 27 volts |
| D14-15 | LED, GREEN | CMD28-21VGC/TR8 | CHICAGO MINATURE | Green |
| F2 | FUSE, LEADED, 1.5 AMPS | R251 01.5 | LITTLEFUSE | 1.5 A |
| J1 | 2 PIN 1.5 MM HEADER | B2B-ZR-SM3-TF | JST | 2 pin |
| J2 | 16 PIN 2 MM HEADER DUAL ROW | B16B-PHDSS-B | JST | 16 PIN DUAL ROW |
| J3 | 4 PIN - 2 MM HEADER | B4B-PH-SM3-TB | JST | 4 pin |
| J4 | 3 PIN - 2 MM HEADER | B3B-PH-SM3-TB | JST | 3 pin |
| J10 | 6 PIN 1.5 MM HEADER | B6B-ZR-SM3-TF | JST | 6 pin |
| J11 | 4 PIN 1.5 MM HEADER | B4B-ZR-SM3-TF | JST | 4 pin |
| J12 | 14 pin dual row header | 10-88-1141 | MOLEX | 14 pin |
| J14 | SMT, 10 PIN CONNECTOR 1.5 MM | B10B-ZR-SM3-TF | JST | 10 pin |
| J15 | 8 PIN HEADER, SMT | B8B-ZR-SM3-TF | JST | 8 pin |
| L1 | Chip Ferrite Bead, Impedance at 100 MHz 220 ohm, 2 A, 0805 | BLM21PG221SN1D | murata | N/A |
| L3 | SURFACE MOUNT INDUCTOR, D05 | DO5022P-684 | COIL CRAFT | 680 uH |
| Q1-6 | 55 V Single N-Channel HEXFET Power MOSFET in a D-Pak package | IRLR2905PBF | IR | N/A |
| R1 R38-39 R66 | RESISTOR, 24.9K, 0603, 100 MW, 1%, 100 PPM | RK73H1JT2492F | KOA/SPEER | 24.9K |
| R2-3 R7 R14 R18 R21 | RESISTOR, 100, 0603, 100 MW, 1%, 100 PPM | RK73H1JT1000F | KOA/SPEER | 100 |
| R4 R6 R11-13 R16-17 R19-20 R22-23 R25-27 R29 R36-37 R40-42 R44-45 R47-52 R63 R70 R72 R79-80 R82 R86 R88 R95 R98 R104-111 | RESISTOR, 10K, 0603, 100 MW, 1%, 100 PPM | RK73H1JT1002F | KOA/SPEER | 10K |
| R5 R10 R24 R46 R78 | RESISTOR, 1K, 0603, 100 MW, 1%, 100 PPM | RK73H1JT1001F | KOA/SPEER | 1K |
| R8 | RESISTOR, 324K OHM, 0603, 100 MW, 1% | RK73H1JT3243F | KOA/SPEER | 324K |
| R9 | RESISTOR, 36.5K, 0603, 100 MW, 1%, 100 PPM | RK73H1JT3652F | KOA/SPEER | 36.5K |
| R15 | RESISTOR, 5.76K, 0603, 100 MW, 1% | RK73H1JT5761F | KOA/SPEER | 5.76K |
| R28 | RESISTOR, 1.10K, 0603, 100 MW, 1% | RK73H1JT1101F | KOA/SPEER | 1.10K |
| R30-33 R96-97 | RESISTOR, .2, 2512, 1 W, 1% | SR733ATTER200F | KOA/SPEER | .2 OHMS |
| R34 | RESISTOR, 2K, 0603, 100 MW, 1%, 100 PPM | RK73H1JT2001F | KOA/SPEER | 2K |
| R35 | RESISTOR, 2.49K, 0603, 100 MW, 1%, 100 PPM | RK73H1JT2491F | KOA/SPEER | 2.49K |

TABLE 1-continued

| Reference | Part Description | Part No. | Manufacturer | Value |
|---|---|---|---|---|
| R43 | RESISTOR, 1 MEG, 0603, 100 MW, 1% | RK73H1JT1004F | KOA/SPEER | 1 MEG |
| R62 R71 | RESISTOR, 100K, 0603, 100 MW, 1%, 100 PPM | RK73H1JT1003F | KOA/SPEER | 100K |
| R68 | RESISTOR, 2.21K, 0603, 100 MW, 1%, 100 PPM | RK73H1JT2211F | KOA/SPEER | 2.21K |
| R69 | RESISTOR, 15K, 0603, 100 MW, 1%, 100 PPM | RK73H1JT1502F | KOA/SPEER | 15K |
| R90 R99-103 | RESISTOR, 10, 0603, 100 MW, 1%, 100 PPM | RK73H1JT10R0F | KOA/SPEER | 10 |
| R91-92 | RESISTOR, 30.1K, 0603, 100 MW, 1%, 100 PPM | RK73H1JT3012F | KOA/SPEER | 30.1K |
| U1 | ADJUSTABLE SWITCHING REGULATOR, SURFACE MOUNT | LT1076CQ | LINEAR TECH | N/A |
| U2 | temp switch, self resetting | 66L080 | AIRPAX | 80 degress C. trip point |
| U3 | SUPPLY SUPERVISOR, open-drain | TPS3838K33DBVT | Texas Instruments (TI) | 3.3 v |
| U4 | 3-PHASE BRIDGE-DRIVER, SOIC, PB free | IR2136SPBF | IR | N/A |
| U5 | Micro-stepping driver .75 amps | A3967SLB | Allegro | N/A |
| U7 | ADJ SWITCHING REGULATOR, 3 A | PTH04070WAS | TI | N/A |
| U8 U10 U19 | INSTRUMENTATION AMPLIFIER | AD623ARM | Analog | N/A |
| U9 | DUAL 256-POSITION SPI, DIG POT, RM-10 PACKAGE | AD5162BRM50 | Analog | N/A |
| U11 | SUPPLY SUPERVISOR, open-drain | TPS3838E18DBVT | TI | 1.8 v |
| U12-13 U16-17 | 256 x 16 sRAM, 44 pin TSOP II | CY7C1041CV33-12ZC | CYCPRESS | N/A |
| U15 | SPI SERIAL EEPROM, 128K, LEAD-FREE | AT25128A-10TI-2.7 | atmel | N/A |
| U18 | LDO, LINEAR REGULATOR, 3.0 V | TPS79530DCQ | TI | N/A |
| U20 U23 | QUAD OP-AMP, rail to rail, TSSOP | AD8609ARU | Analog | N/A |
| U21 | TRANSISTOR ARRAY, 5 POSTION, SOIC-14 | LM3046M | National Semi | N/A |
| U22 U24-26 | Dual FET, micro8 | IRF7503AIDB2T | International Rectifier | N/A |
| U27 | 16 bit DSP | TMS320F2812PGFA | TI | N/A |
| U28 | DUAL 2 - 4 LINE DECODER, TSSOP PACKAGE | SN74LVC139APW | TI | N/A |
| U30-32 U34 U45-46 | HIGH SPEED TRANSCEIVER | SN65LVDM176DGK | TI | N/A |
| U35 | FIXED LINEAR REGULATOR, 15 V, 100 MA, SO-8 | LM78L15ACM | National Semi | 15 V |
| U38-41 U44 | SMALL SIGNAL DUAL DIODE | BAV99 | Fairchild | N/A |
| U42 | 2.5 V DC REFERENCE, SOT23-3 | REF3025 | TI | N/A |
| U49 | CMOS Switched-Cap voltage converter | ADM660AR | Analog | N/A |
| X3 | 20 Mhz Crystal | HC49SPX - 20 Mhz | Fox | 20 Mhz |

Figure 11:
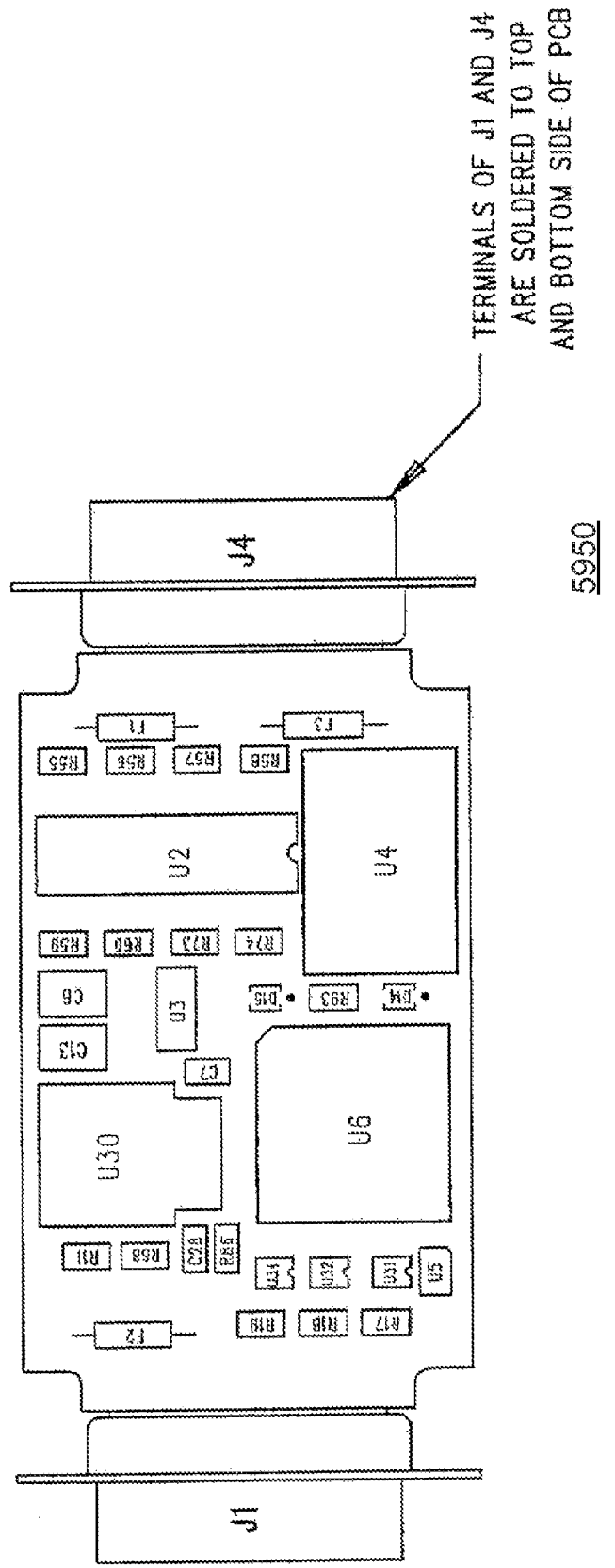
FIG. 11 is the top side view of a circuit board implementing one embodiment of a pump I/O interface module.
Figure 12:
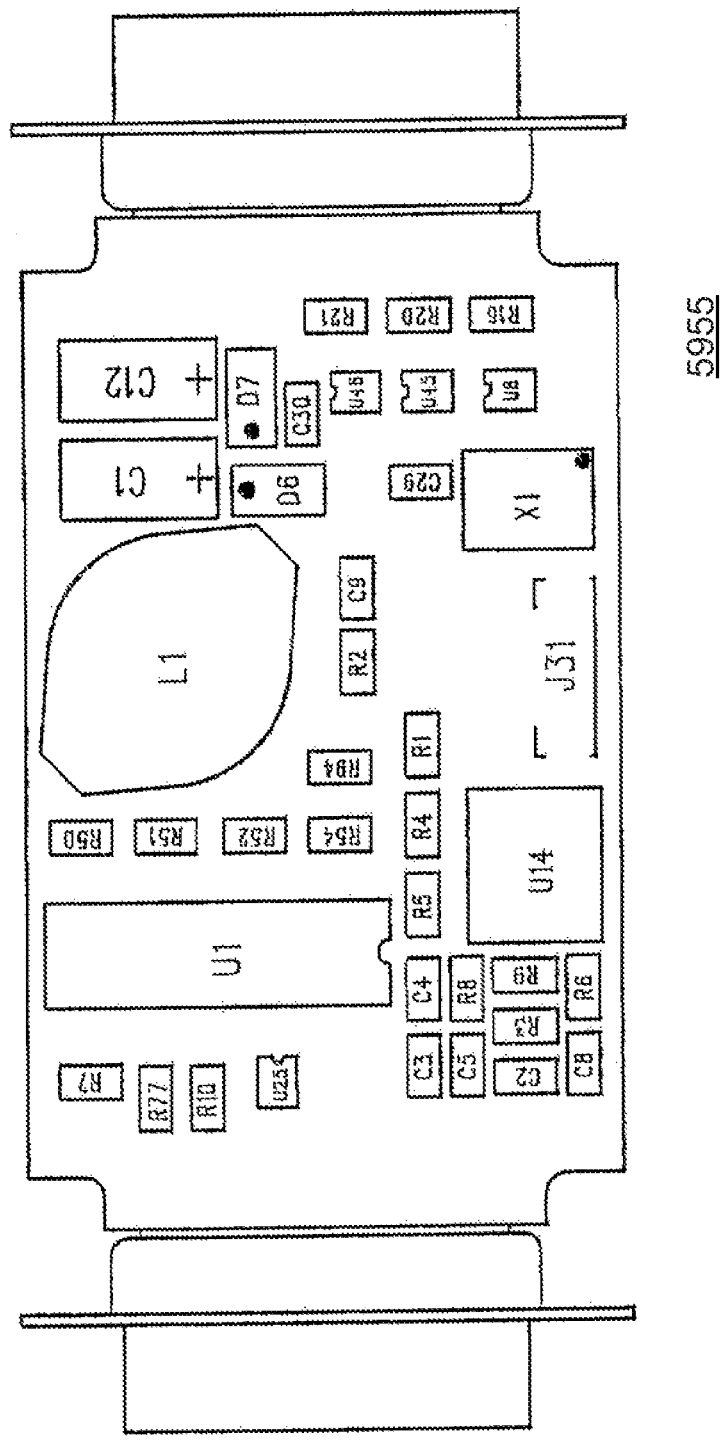
FIG. 12 is the bottom side view of the circuit board of FIG. 11.

FIG. 11 is a diagrammatic representation of a first or top side 5950 of a circuit board implementing one embodiment of I/O interface module 5550. FIG. 12 is a diagrammatic representation of a second or bottom side 5955 of the circuit board of FIG. 11 implementing one embodiment of I/O interface module 5550. TABLE 2 below provides a sample BOM for one embodiment of I/O interface module 5550:

TABLE 2

| Reference | Part Description | Part No. | Manufacturer | Value |
|---|---|---|---|---|
| C1 C12 | CAPACITOR, TANT, 10 uF, CASE D, 35 V, 10% | 593D106X9035D2W | Vishay | 10 uF |
| C2-5 C8 | CAPACITOR, Y5V, .1 uF, 0603, 25 V | GRM32DR71E106KA12L | MuRata | .1 uF |
| C6 C13 | CAP, MLCC, 1210, 6.3 V, X5R, 47 uF ± 10%, T&R | C1210C476K9PAC | Kemet | 47 uF |
| C7 C9 C28-30 | CAPACITOR, Y5V, .01 uF, 0603, 25 V | C0603C103K5RAC | Kemet | .01 uF |
| D14-15 | LED, GREEN | CMD28-21VGC/TR8 | CHICAGO MINATURE | |
| D6 | SCHOTTKY BARRIER DIODE | PRLL5819 | PHILLIPS | N/A |

TABLE 2-continued

| Reference | Part Description | Part No. | Manufacturer | Value |
|---|---|---|---|---|
| D7 | 27 V Zener Diode, surface mount SOD87 | BZD27-C27 | PHILLIPS | 27 volts |
| F1-3 | FUSE, LEADED, 1.5 AMPS | R251 01.5 | LITTLEFUSE | 1.5 A |
| J1 | 15 pin sub-D, female | 172-E15-202-021 | Norcomp | 15 pin |
| J31 | 1.5 MM 5 PIN HEADER, SURFACE MOUNT | B5B-ZR-SM3-TF | JST MFG CO | 5 PIN |
| J4 | 15 pin sub-D, male | 172-E15-102-021 | Norcomp | 15 pin |
| L1 | SURFACE MOUNT INDUCTOR, D05 | DO5022P-684 | COIL CRAFT | 680 uH |
| R1 R3-10 R55-60 R73-74 R77 R86 R93-94 | RESISTOR, 10K, 0603, 100 MW, 1%, 100 PPM | RK73H1JTTD1002F | KOA, SPEER ELECTRONICS | 10K |
| R11 | RESISTOR, 2.67K, 0603, 100 MW, 1%, 100 PPM | RK73H1JTTD2671F | KOA, SPEER ELECTRONICS | 2.67K |
| R16-21 | RESISTOR, 100, 0603, 100 MW, 1%, 100 PPM | RK73H1JTTD1000F | KOA, SPEER ELECTRONICS | 100 |
| R2 | RESISTOR, 100K, 0603, 100 MW, 1%, 100 PPM | RK73H1JTTD1003F | KOA, SPEER ELECTRONICS | 100K |
| R50-52 R54 | RESISTOR, 1K, 0603, 100 MW, 1%, 100 PPM | RK73H1JTTD1001F | KOA, SPEER ELECTRONICS | 1K |
| R68 | RESISTOR, 2.21K, 0603, 100 MW, 1%, 100 PPM | RK73H1JTTD2211F | KOA, SPEER ELECTRONICS | 2.21K |
| U1-2 | OPTOCOUPLER, QUAD, SMD-16 | ILQ66-4X009 | VISHAY | N/A |
| U14 | TRANSISTOR ARRAY, 5 POSTION, SOIC-14 | LM3046M | NATIONAL SEMICONDUCTOR | N/A |
| U25 | Dual FET, micro8 | IRF7503 | International Rectifier | N/A |
| U3 | LDO, LINEAR REGULATOR, 3.3 V, 1 A | TPS79633DCQ | TI | N/A |
| U30 | ADJUSTABLE SWITCHING REGULATOR, SURFACE MOUNT | LT1076CQ | LINEAR TECH | N/A |
| U4 | 3 V MULTICHANNEL RS232 LINE DRIVER | MAX3243CDW | TI | N/A |
| U5 | DAUL-SUPPLY BUS TRANSCEIVER | SN74LVC1T45DCK | TI | N/A |
| U6 | 8 BIT MICRO CONTROLLER, TQFP-80 | PIC18F8720-I/PT | MICROCHIP | N/A |
| U8 U31-32 U34 U45-46 | HIGH SPEED TRANSCEIVER | SN65LVDM176DGK | TI | N/A |
| X1 | OSCILLATOR, SURFACE MOUNT, 20 Mhz | F3345-200 | FOX | 20 Mhz |

Figure 13:
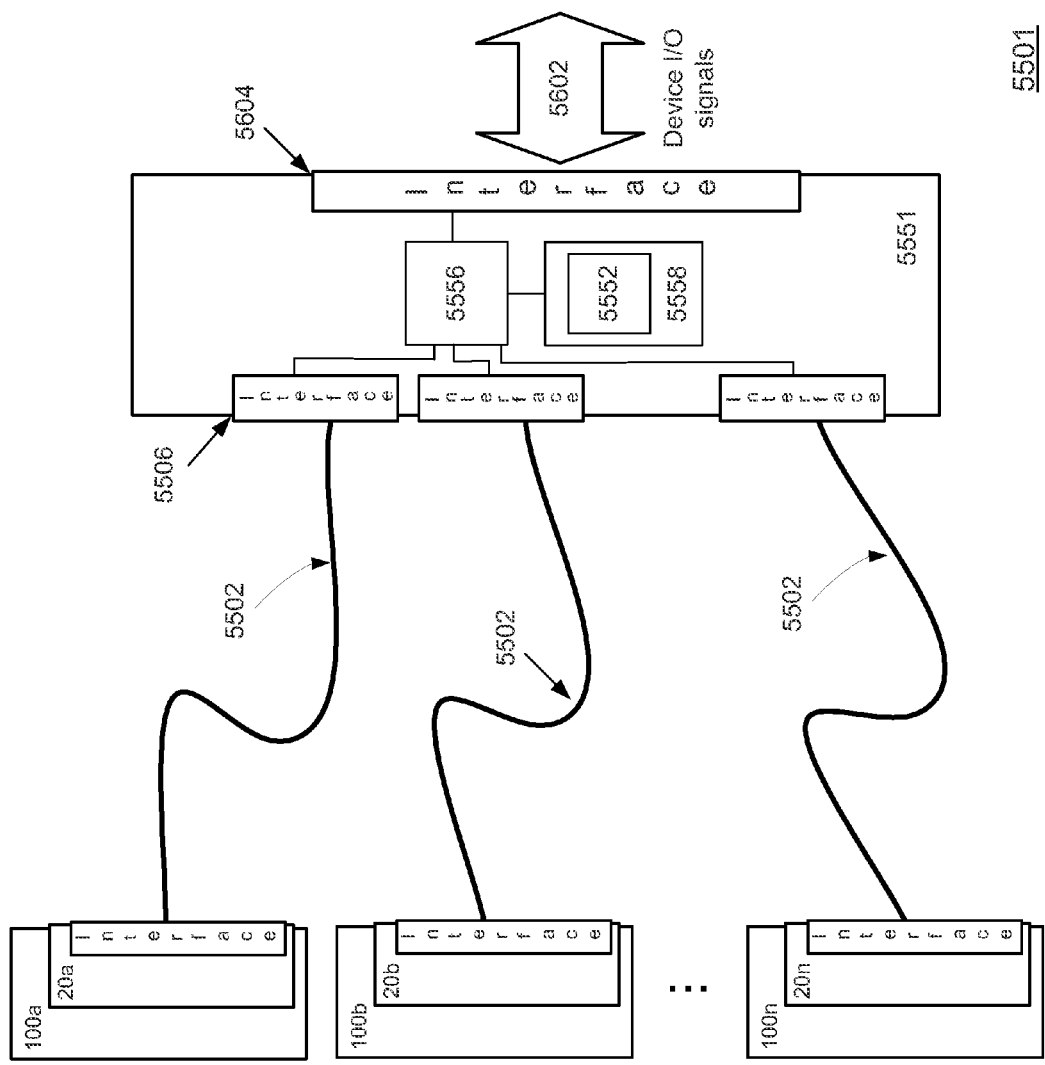
FIG. 13 is a diagrammatic representation of one embodiment of a system for interfacing one or more pump controllers with one or more devices via one pump I/O interface module.

Embodiments of the invention disclosed herein provide many advantages. One advantage is that, by eliminating the distance limitation imposed by discrete lines used in prior systems, embodiments of the present invention allow cable connections/disconnections to be removed or separate from the area where the pump operates. FIG. 13 is a diagrammatic representation of an I/O system 5501 comprising an I/O interface module 5551 and one or more cables 5502 for interfacing one or more pumps 100 (100a . . . 100n) with other devices 5602. As illustrated in FIG. 13, I/O interface module 5551 is at the end of cables 5502. By plugging into I/O interface module 5551, devices 5602 can control pump 5100 from some distance away. This is an advantage because pumps often use harmful process chemicals and it can be dangerous to plug/unplug electrical connections near where the pump operates.

As FIG. 13 exemplifies, I/O interface module 5551 can be configured with more than one data communications interfaces 5506 for interfacing with more than one pump controllers (20a . . . 20n) so that signals/data for multiple pumps can be routed through a single module. This configuration can greatly reduce cabling. I/O interface module 5551 may have one or more data communications interface 5604 for interfacing with other devices, depending upon implementation.

Another advantage of embodiments of the invention is that the I/O interface module can reduce the computational power and/or data storage space required at the pump. In the example shown in FIG. 13, software instruction 5552 carried on memory 5558 can cause I/O controller or processor 5556 to service the plurality of pumps 100a . . . 100n in an efficient, consistent manner. For example, while pump 100a is idling, I/O controller 5556 can service pump 100b, and so on. Other than local control functions such as motor movement, the logic and hence intelligence for controlling pumps 100a . . . 100n can be allocated to I/O interface module 5551, which has a more powerful, faster processor and perhaps bigger memory. This configuration allows the distribution of the pump controller's functionality. Furthermore, this configuration can greatly reduce cost because it would be more economical and efficient to implement expensive parts (e.g., processor, memory, etc.) on a single module than on a plurality of pumps.

Figure 14:
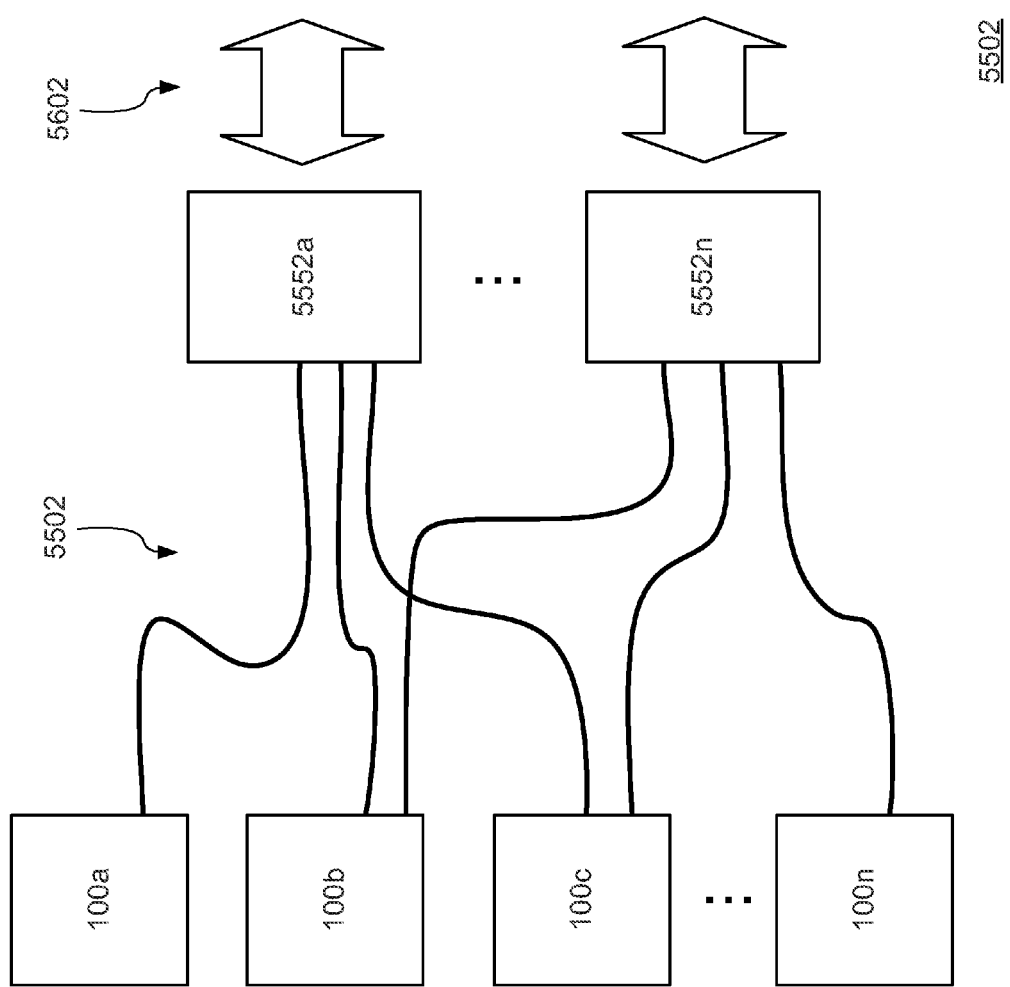
FIG. 14 is a diagrammatic representation of one embodiment of a system for interfacing one or more pump controllers with one or more devices through multiple pump I/O interface modules.

FIG. 14 is a diagrammatic representation of an I/O system 5502 having a plurality of I/O interface modules 5552a . . . 5552n and a plurality of cables 5502 for interfacing a plurality of pumps 100a . . . 100n with a plurality of devices 5602. In I/O system 5502, the logic for controlling pumps 100a . . . 100n can be allocated or distributed among the plurality of I/O interface modules 5552a . . . 5552n. This can be done without regard to the processing power of pump 100a . . . 100n. Alternatively, the logic/functionality for controlling pumps 100a . . . 100n can be allocated or distributed among the plurality of I/O interface modules 5552a...5552n and the plurality of pumps 100a...100n. Other implementations are also possible.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope and spirit of this invention. Accordingly, the scope of the invention should be determined by the following claims and their legal equivalents.

What is claimed is:

1. An input/output interface apparatus, comprising:
a processor residing on a circuit board;
a non-transitory computer readable medium coupled to said processor and carrying software instructions executable by said processor; and
at least two data communications interfaces including a first data communications interface coupled to said processor and communicating serially with a pump controller via a first cable and a second data communications interface coupled to said processor and communicating discrete line signals with a control device via a second cable, wherein each of the discrete line signals is communicated on a single dedicated line and communicates one of a predetermined set of discrete states,
wherein said software instructions are further executable by said processor to map multiple ones of said discrete line signals to bits in a packet for serial communication with said pump controller,
wherein when said discrete line signals are received via said second data communications interface from said control device, corresponding ones of said bits are set in an outgoing packet that is transmitted to said pump controller via said first data communications interface, and
wherein when an incoming packet is received via said first data communications interface from said pump controller, ones of said discrete line signals on said second data communications interface are set based on corresponding ones of said bits in the incoming packet.

2. The input/output interface apparatus of claim 1, wherein said first data communications interface and said second data communications interface implement different data communications protocols and wherein said software instructions are further executable by said processor to translate data from a first communications protocol to a second data communications protocol.

3. The input/output interface apparatus of claim 1, wherein said first cable comprises serial lines, wherein said serial lines comprise serial data transmission lines for transmitting data to said pump controller, serial data receive lines for receiving data from said pump controller, clock lines for carrying synchronization clock signals, slave enable lines, and power/ground lines.

4. The input/output interface apparatus of claim 3, wherein said software instructions are further executable by said processor to send said packet over said serial lines.

5. The input/output interface apparatus of claim 1, wherein said software instructions are further executable by said processor to generate a simulated signal and send said simulated signal to said control device.

6. The input/output interface apparatus of claim 5, wherein said software instructions are further executable by said processor to receive a discrete line signal from said control device over said second cable and determine whether to generate said simulated signal.

7. The input/output interface apparatus of claim 1, wherein said second cable comprises discrete lines, wherein said discrete lines comprise discrete communications lines and wherein each discrete communications line is for a dedicated function and carries a discrete signal associated with a function of said pump controller.

8. The input/output interface apparatus of claim 1, wherein said second data communications interface comprises discrete lines, wherein said discrete lines comprise discrete communications lines and wherein each discrete communications line is for a dedicated function and carries a discrete signal associated with a function of said pump controller.

9. The input/output interface apparatus of claim 1, wherein said second data communications interface includes a serial connection to said control device.

10. An input/output (I/O) system for interfacing at least one pump controller with at least one control device, comprising:
a first I/O interface apparatus, comprising:
a processor residing on a circuit board;
a non-transitory computer readable medium coupled to said processor and carrying software instructions executable by said processor; and
at least two data communications interfaces having a first data communications interface coupled to said processor which communicates serially with said at least one pump controller and a second data communications interface coupled to said processor which communicates discrete line signals with said at least one control device, wherein each of the discrete line signals is communicated on a single dedicated line and communicates one of a predetermined set of discrete states,
wherein said software instructions are further executable by said processor to map said discrete line signals received from said control device to bits in a packet for serial communication with said pump controller,
wherein when said discrete line signals are received via said second data communications interface from said control device, corresponding ones of said bits are set in an outgoing packet that is transmitted to said pump controller via said first data communications interface, and
wherein when an incoming packet is received via said first data communications interface from said pump controller, ones of said discrete line signals on said second data communications interface are set based on corresponding ones of said bits in the incoming packet.

11. The I/O system of claim 10, wherein said first data communications interface and said second data communications interface implement different data communications protocols and wherein said software instructions are further executable by said processor to translate data from a first communications protocol to a second data communications protocol.

12. The I/O system of claim 10, wherein said first I/O interface apparatus comprises two or more first data communications interfaces coupled to said processor for communicating with said at least one pump controller.

13. The I/O system of claim 10, wherein said first I/O interface apparatus comprises two or more second data communications interfaces coupled to said processor for communicating with said at least one control device.

14. The I/O system of claim 10, wherein said software instructions are further translatable by said processor to generate a simulated signal and send said simulated signal to said control device.

15. A method for interfacing at least one pump controller with at least one control device, comprising:

implementing a first input/output (I/O) interface module on a circuit board, wherein said first I/O interface module comprises a processor, a non-transitory computer readable medium coupled to said processor and carrying software instructions executable by said processor, and at least two communications interfaces coupled to said processor for communicating with said at least one pump controller and said at least one control device, wherein each of said at least two communications interfaces provides a plurality of communications lines, at least a first communications interface includes serial lines which communicate serially with said at least one pump controller, and wherein at least a second communications interface includes discrete lines which communicate discrete line signals with said at least one control device, wherein each of the discrete line signals is communicated on a single dedicated line and communicates one of a predetermined set of discrete states;

bundling said communications lines into a cable having a finite number of conductors; and configuring said first I/O interface module with at least two data communications protocols, including at least one serial communications protocol, to accommodate said finite number of conductors; and mapping discrete line signals received from a control device via said second communications interface to bits in a packet for serial communication with a pump controller via said first communications interface, wherein when said discrete line signals are received via said second data communications interface from said control device, corresponding ones of said bits are set in an outgoing packet that is transmitted to said pump controller via said first data communications interface, and wherein when an incoming packet is received via said first data communications interface from said pump controller, ones of said discrete line signals on said second data communications interface are set based on corresponding ones of said bits in the incoming packet.

16. The method of claim 15, further comprising configuring said first I/O interface module for interpreting signals from said at least one control device according to a first data communications protocol and asserting corresponding signals to said at least one pump controller according to a second data communications protocol and for interpreting signals from said at least one pump controller according to said second data communications protocol and asserting corresponding signals to said at least one control device according to said first data communications protocol.

17. The method of claim 15, further comprising configuring said first I/O interface module to, in response to receiving one or more discrete line signals from one of said at least one control device, determine whether one of said at least one pump controller is to move a motor.

18. The method of claim 15, further comprising configuring said first I/O interface module to, in response to receiving one or more discrete line signals from a first control device of said at least one control device, generate and send one or more simulated signals back to said first control device to prevent one or more errors.

\* \* \* \* \*